Jan. 2, 1962 C. A. NIELSEN ET AL 3,015,536

TWO SPEED REVERSIBLE RECORD CHART DRIVE

Filed May 31, 1957 12 Sheets-Sheet 1

INVENTORS
Carl A. Nielsen
Edward E. Ewen
Paul H. Sherrick
By Wallenstein & Spangenberg attys.

TWO SPEED REVERSIBLE RECORD CHART DRIVE

Filed May 31, 1957 12 Sheets-Sheet 2

INVENTORS
Carl A. Nielsen
Edward F. Ewen
Paul H. Sherrick
By Wallenstein & Spangenberg Attys.

INVENTORS
Carl A. Nielsen
Edward F. Ewen
Paul H. Sherrick

By: Wallenstein & Spangenberg attys

TWO SPEED REVERSIBLE RECORD CHART DRIVE

Filed May 31, 1957 12 Sheets-Sheet 4

Inventors
Carl A. Nielsen
Edward F. Ewen
Paul H. Sherrick
By: Wallenstein & Spangenberg Attys.

TWO SPEED REVERSIBLE RECORD CHART DRIVE

Filed May 31, 1957 12 Sheets-Sheet 5

Inventors:
Carl A. Nielsen
Edward F. Ewen
Paul H. Sherrick
By: Wallenstein & Spangenberg Attys

TWO SPEED REVERSIBLE RECORD CHART DRIVE

Filed May 31, 1957 12 Sheets-Sheet 6

INVENTORS
Carl A. Nielsen
Edward F. Ewen
Paul H. Sherrick
By: Wallenstein & Spangenberg Attys

TWO SPEED REVERSIBLE RECORD CHART DRIVE

Filed May 31, 1957 12 Sheets-Sheet 7

INVENTORS.
Carl A. Nielsen
Edward F. Ewen
Paul H. Sherrick
By: Wallenstein & Spangenberg Attys.

INVENTORS
Carl A. Nielsen
Edward F. Ewen
Paul H. Sherrick
By Wallenstein & Spangenberg Attys.

TWO SPEED REVERSIBLE RECORD CHART DRIVE

INVENTORS.
Carl A. Nielsen
Edward F. Ewen
Paul H. Sherrick
By Wallenstein & Spangenberg attys.

Jan. 2, 1962 C. A. NIELSEN ET AL 3,015,536

TWO SPEED REVERSIBLE RECORD CHART DRIVE

Filed May 31, 1957 12 Sheets-Sheet 10

INVENTORS
Carl A. Nielsen
Edward F. Ewen
Paul H. Sherrick
By: Wallenstein & Spangenberg attys.

INVENTORS
Carl A. Nielsen
Edward F. Ewen
Paul H. Sherrick
By: Wallenstein & Spangenberg Attys.

TWO SPEED REVERSIBLE RECORD CHART DRIVE

Filed May 31, 1957 12 Sheets-Sheet 12

INVENTORS
Carl A. Nielsen
Edward F. Ewen
Paul H. Sherrick
By: Wallenstein & Spangenberg attys

United States Patent Office 3,015,536
Patented Jan. 2, 1962

3,015,536

TWO SPEED REVERSIBLE RECORD CHART DRIVE

Carl A. Nielsen, Chicago, Edward F. Ewen, Northbrook, and Paul H. Sherrick, Winnetka, Ill., assignors to E. H. Sargent & Co., Chicago, Ill., a corporation of Illinois
Filed May 31, 1957, Ser. No. 662,914
11 Claims. (Cl. 346—136)

This invention is directed to a measuring and recording instrument and more particularly to a portable or bench type instrument for analytical or testing use in laboratories or the like.

The measuring and recording instrument of this invention is preferably of the type including a self-balancing potentiometer apparatus, wherein the unbalanced D.C. current of the potentiometer circuit is transformed into an alternating current of one phase or of opposite phase depending upon the direction of unbalance of the potentiometer circuit, wherein the alternating current is amplified to operate a reversible electric motor in one direction or the opposite direction depending upon the phase of the alternating current, wherein operation of the reversible electric motor rebalances the potentiometer circuit, and wherein the reversible electric motor also operates a recording mechanism with respect to a moving chart whereby conditions being measured by the potentiometer apparatus are recorded upon the chart.

The principal object of this invention is to incorporate into such a measuring and recording apparatus features which particularly adapt the same for portable or bench type use and for analytical or testing use in laboratories or the like.

Briefly, the measuring and recording instrument embodying the features of this invention includes a hollow substantially rectangular base adapted to rest upon a bench or the like and the potentiometer measuring apparatus and electronic amplifier are removably housed within the hollow base. A frame is secured to and extends upwardly from the top of the base and it includes a pair of side plates spaced inwardly from the sides of the base. A chart feed roll is rotatably mounted between the side plates adjacent the top of the frame, a chart supply roll is rotatably mounted between the side plates adjacent the bottom rear of the frame, and a chart take-up roll is rotatably mounted between the side plates adjacent the bottom front of the frame. A platen also extends between the side plates adjacent the front of the frame. A chart extends from the chart supply roll over the chart feed roll and the platen to the chart take-up roll. A recording mechanism is movable across the chart adjacent the chart feed roll for recording measured conditions on the chart.

The reversible electric motor which is controlled by the electronic amplifier and which rebalances the potentiometer circuit is carried by one of the side plates and operates the recording mechanism and the balancing slide wire. This reversible motor may also operate an additional slide wire for remote indication or recording purposes. Another reversible electric motor is carried by one of the side plates and operates through gearing and an electromagnetic clutch to rotate the chart feed roll in one direction or the other as desired, the speed of operation being determined by selecting gearing of desired ratios. An adjustable speed reducer mechanism may also be utilized for obtaining desired chart speeds. Still another reversible electric motor is carried by one of the side plates and it operates an automatically shifting friction drive wheel which engages either the chart take-up roll or the chart feed roll for selectively rotating the same. These last two mentioned reversible electric motors and the electromagnetic clutch are controlled by a switch mechanism carried by the front of the base.

When the switch mechanism is in a "brake" position, the clutch is engaged, a D.C. braking current is passed through the chart feed roll motor to brake the same, and the friction drive wheel motor is de-energized, so as to lock the chart feed roll and hence the chart in position. When the switch mechanism is shifted to the "forward" position, the clutch is engaged, the chart feed roll motor is operated to drive the chart feed roll in a direction to feed the chart from the chart supply roll to the chart take-up roll, and the friction drive wheel motor is operated to move the friction drive wheel against the chart take-up roll and rotate the same to tension the chart. When the switch mechanism is shifted to "reverse" position, the clutch is engaged, the chart feed roll motor is operated in the opposite direction to feed the chart from the chart take-up roll to the chart supply roll, and the friction drive wheel motor is operated in the opposite direction to move the friction drive wheel against the chart supply roll and rotate the same to tension the chart in its reverse movement.

When the switch mechanism is shifted to a "neutral" position, the clutch is released and the chart feed roll motor is de-energized to allow free wheeling of the chart feed roll. In this "neutral" position the friction drive wheel motor is under the control of a three position switch, which, when shifted to one position, de-energizes the motor to allow ready manual manipulation of the chart, and which, when shifted to one or the other of the remaining positions operates the motor in one direction or the other to move the chart rapidly in one or the other of the selected directions. This versatile operation of the chart is extremely beneficial in analytical and testing work encountered in laboratories or the like. This switch mechanism may also control a remote control circuit for operating other equipment simultaneously with the operation of the chart forwardly and rearwardly as the chart is driven by the chart feed roll motor.

A releasable brake mechanism is also provided for the chart supply roll and the chart take-up roll, this brake mechanism normally braking these rolls for the purpose of maintaining the chart in tension and for maintaining the chart tightly wound on the rolls. The releasable brake mechanism is operated in conjunction with the friction drive wheel so that, when the friction drive wheel engages and drives the chart take-up roll, the brake mechanism is released from the chart take-up roll, and, when the friction drive wheel engages and drives the chart supply roll, the brake mechanism is released from the chart supply roll.

A housing is secured to and extends above the top of the hollow base and encloses the frame and the parts carried thereby. The housing is open in the front to expose the chart where it passes over the platen for visually displaying the measured conditions recorded on the chart and for permitting marking notations on the chart. The platen is pivotally mounted so that it may be swung outwardly to facilitate marking notations on the chart. The sides of the housing are pivotally mounted so as to be opened to provide access to the various motors, clutch and gearing. Sufficient space is provided between the side plates and the sides of the housing to allow storage for the interchangeable gears for the chart feed roll, recording pens and the like.

The front of the hollow base removably carries a front panel which, in turn, carries various components of the potentiometer apparatus, and, likewise, the rear of the base also removably carries a rear panel which, in turn, carries various components of the amplifier and portions of the potentiometer apparatus which need replacement from time to time. By removing the panels substantially all of the components are made accessible for service and repair. All of the adjustments and controls used in the normal operation of the machine are carried by the front panel for convenient manipulation.

The potentiometer apparatus includes a plurality of range adjusting resistances for providing a series of related full scale ranges, for example, 1.25, 2.5, 5.0, 12.5, 25, 50, 125, 250, 500, 1250 and 2500 which are selectively brought into play by a multiple position switching mechanism arranged on the front panel. These related full scale ranges may all be utilized with a common recording chart having, for example, five main chart areas numbered between 0, 50, 100, 150, 200 and 250, each main chart area having five sub-areas, and each sub-area having ten basic areas. This straight line relation between the full scale ranges and the chart designations provides for extreme flexibility which is particularly beneficial in analytical and test work done in laboratories or the like. The main time areas on the chart are 1 inch and each is divided into 10 sub-areas. By means of selecting appropriate gearing the chart may be driven by the chart feed roll at speeds of ⅓, ½, 1, 1½, 2, 2⅔, 4, 8 and 12 inches per minute, and these speeds may be increased by 5 times or decreased by 5 times by the adjustable speed reducer mechanism. These time designations on the chart and these chart speed selections also provide for extreme flexibility which is particularly beneficial in analytical and test work.

The potentiometer apparatus also includes a unit selecting mechanism for selectively measuring volts, millivolts, milliamps and microamps, which also is extremely desirable in analytical and testing procedures encountered in laboratories and the like, and, here, this is further tied in with the full scale ranges so that all of these units in various ranges may be recorded on a common chart.

Provision is also made in the potentiometer apparatus for chart range displacement, this being accomplished with a separate cell and a multiple switch mechanism for obtaining high, medium, low or no amounts of displacement. Each of these displacement amounts may also be continuously adjusted at will. By manipulating this multiple switching mechanism, the exact amount of chart range displacement may be recorded on the chart.

Another provision of the potentiometer apparatus of this invention eliminates or at least greatly minimizes the need for standardizing the potentiometer circuit over long periods of time. Here, the usual high current batteries or cells, which are connected in series with the standardizing rheostat across the slide wire for supplying balancing voltage thereto, have low current, substantially constant voltage batteries or cells connected in parallel thereto. A resistor is connected in series with the high current batteries or cells to drop the voltage produced thereby slightly below the voltage produced by the low current, substantially constant voltage batteries or cells. Substantially all of the current supplied to the slide wire comes from the high current batteries or cells and substantially none from the low current batteries or cells, and the latter operate to keep the voltage across the slide wire substantially constant. As a result frequent standardizing, as required in the past, is eliminated, and only infrequent standardizing is required, if at all. A switch is connected across the dropping resistor in series with the high current batteries or cells and is automatically closed to shunt the resistor when the low current batteries or cells are removed from the potentiometer circuit, so that the high current batteries or cells may be used in the conventional manner for applying a voltage across the slide wire.

The potentiometer apparatus also includes a calibrating potentiometer for initially calibrating the instrument from a known voltage source so as to assure full travel of the recording mechanism across the chart over the range of voltage applied and to compensate for inaccuracies in the recording mechanism, as, for example, the diameter of the cable drum which drives the recording mechanism.

An adjustable degenerative feedback is applied from the reversible electric motor which rebalances the potentiometer apparatus to the second stage of amplification of the electronic amplifier which controls the operation of the rebalancing electric motor for damping on anti-hunting purposes. A pushbutton switch mechanism which is operated for the purpose of standardizing the potentiometer apparatus also operates to decrease the amount of degenerative feedback during potentiometer standardizing operation which makes possible quicker and more accurate standardizing.

As expressed above, the D.C. current in the potentiometer circuit is converted to an alternating current of one phase or of opposite phase in accordance with the direction of unbalance of the potentiometer circuit, and this alternating current is amplified for controlling the operation of the electric motor for rebalancing the potentiometer circuit. Preferably, the alternating current so produced is a 60 cycle alternating current. If a 60 cycle alternating stray current is picked up in the potentiometer circuit, it is converted into a 120 cycle alternating current, which is applied to the amplifier. This 120 cycle alternating current which produces no turning effect upon the motor will, however, if it is of sufficient magnitude, operate to swamp the amplifier. Accordingly, the amplifier of the instrument of this invention is provided, between the second and third stages of amplification thereof, with a filter which passes a narrow band centered at a frequency of 60 cycles and which provides excellent rejection of 120 cycles. Thus, swamping of the amplifier due to 60 cycle stray pickup currents in the potentiometer circuit is prevented. It is here noted that the degenerative feedback from the electric motor is fed into the amplifier ahead of the filter, so that any 120 cycle component in the feedback current is also filtered out to provide for maximum damping effects.

All of the various foregoing features, while being of themselves individually important, also structurally and functionally cooperate to provide an extremely reliable, accurate and flexible portable bench type measuring and recording instrument which is particularly adaptable for analytical and testing purposes in laboratories and the like.

Other objects of this invention reside in the details of construction of the measuring and recording instrument and in the cooperative relationships between the component parts thereof.

Further objects and advantages of this invention will become apparent to those skilled in the art upon reference to the accompanying specification, claims and drawings, in which:

Figure 3:
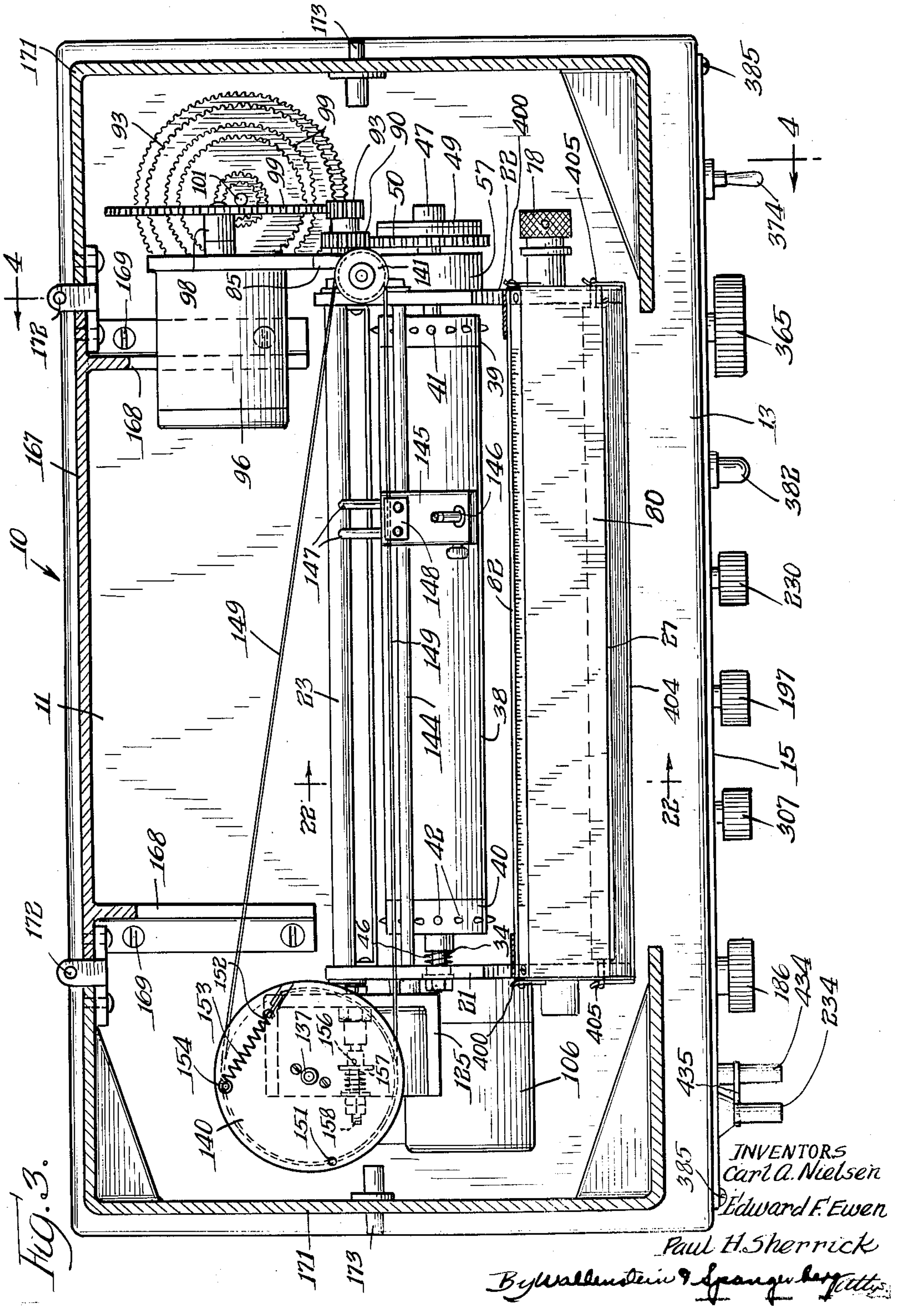
FIG. 3 is a top plan view of the measuring and recording instrument as illustrated in FIG. 1 with the upper housing shown in sectional view, which is taken along the line 3—3 of FIG. 4.
Figure 4:
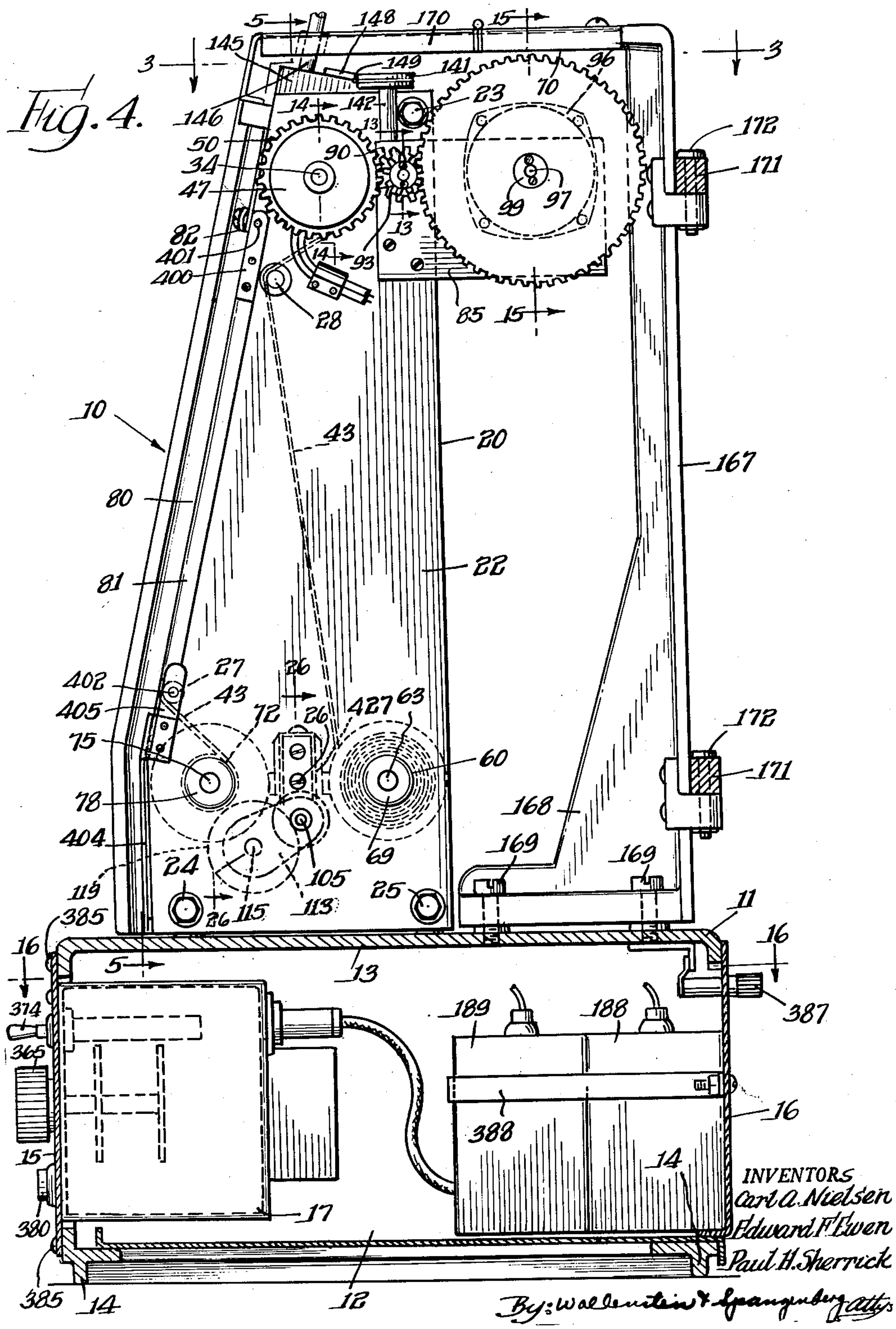
FIG. 4 is a vertical sectional view through the instrument taken substantially along the line 4—4 of FIG. 3.
Figure 5:
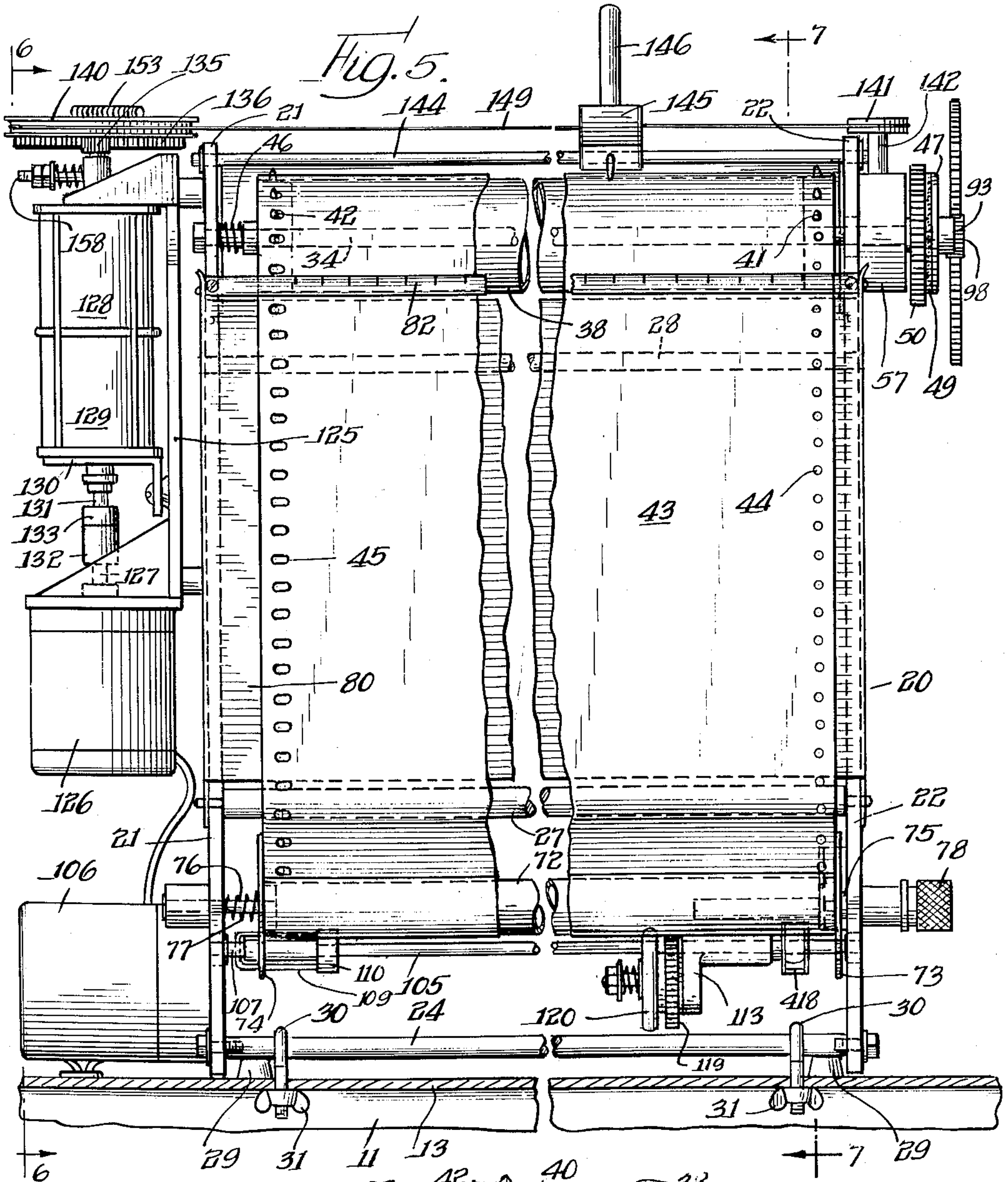
FIG. 5 is a front elevational view of the upper portion of the instrument as shown by the line 5—5 of FIG. 4.
Figure 8:
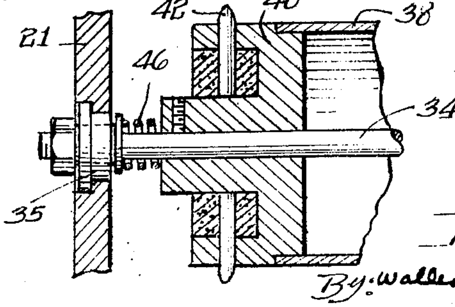
FIG. 8 is an enlarged sectional view of the end of the chart feed roll illustrated in the upper left hand portion of FIG. 5.
Figure 7:
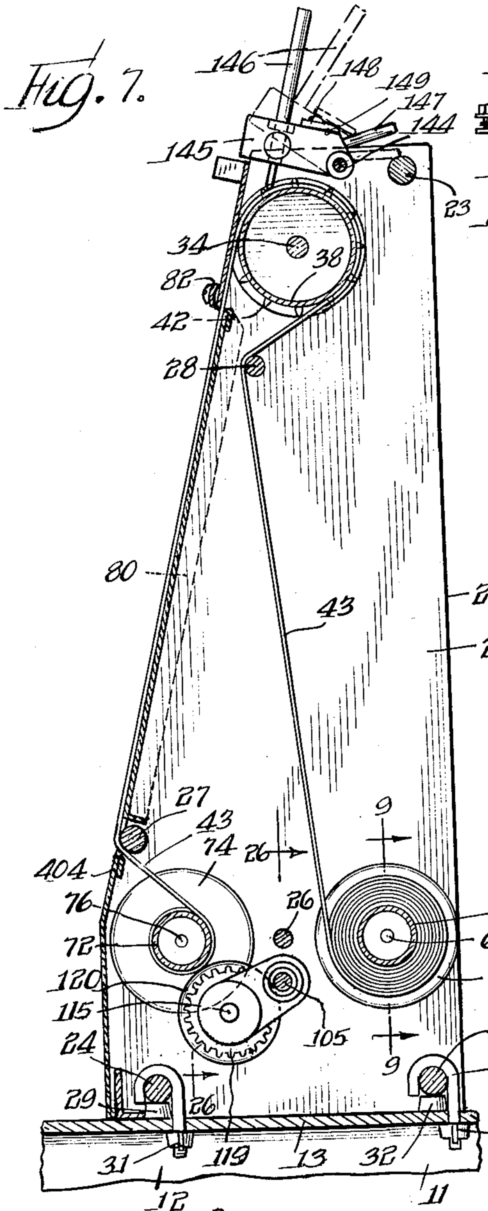
FIG. 7 is a vertical sectional view through the instrument taken substantially along the line 7—7 of FIG. 5.
Figure 6:
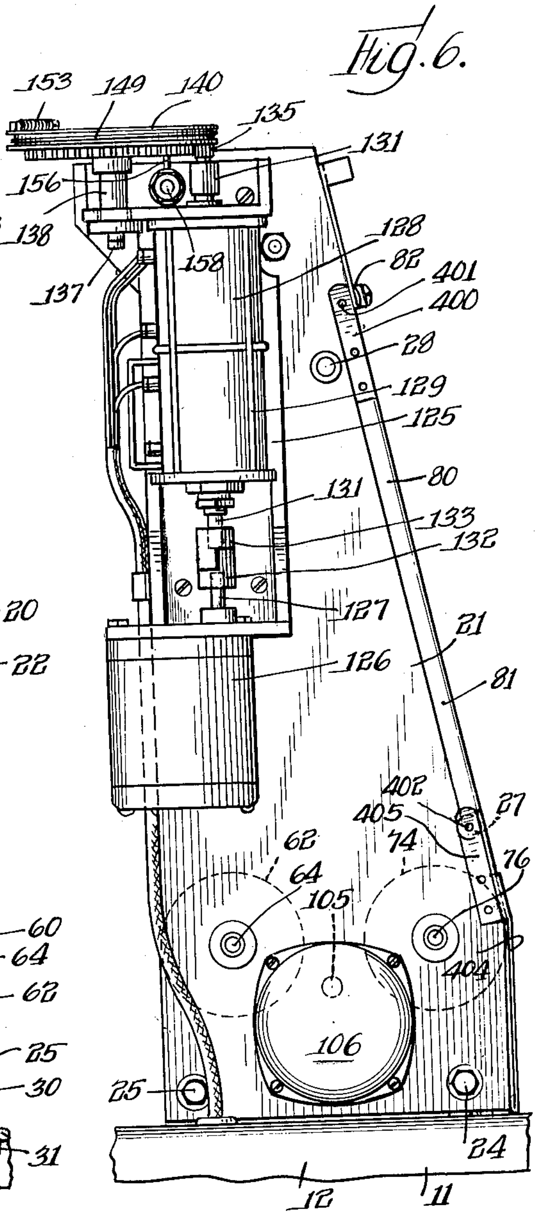
FIG. 6 is a side elevational view of the instrument looking from the left of FIGS. 1, 3 and 5, as illustrated by the line 6—6 of FIG. 5.
Figure 20:
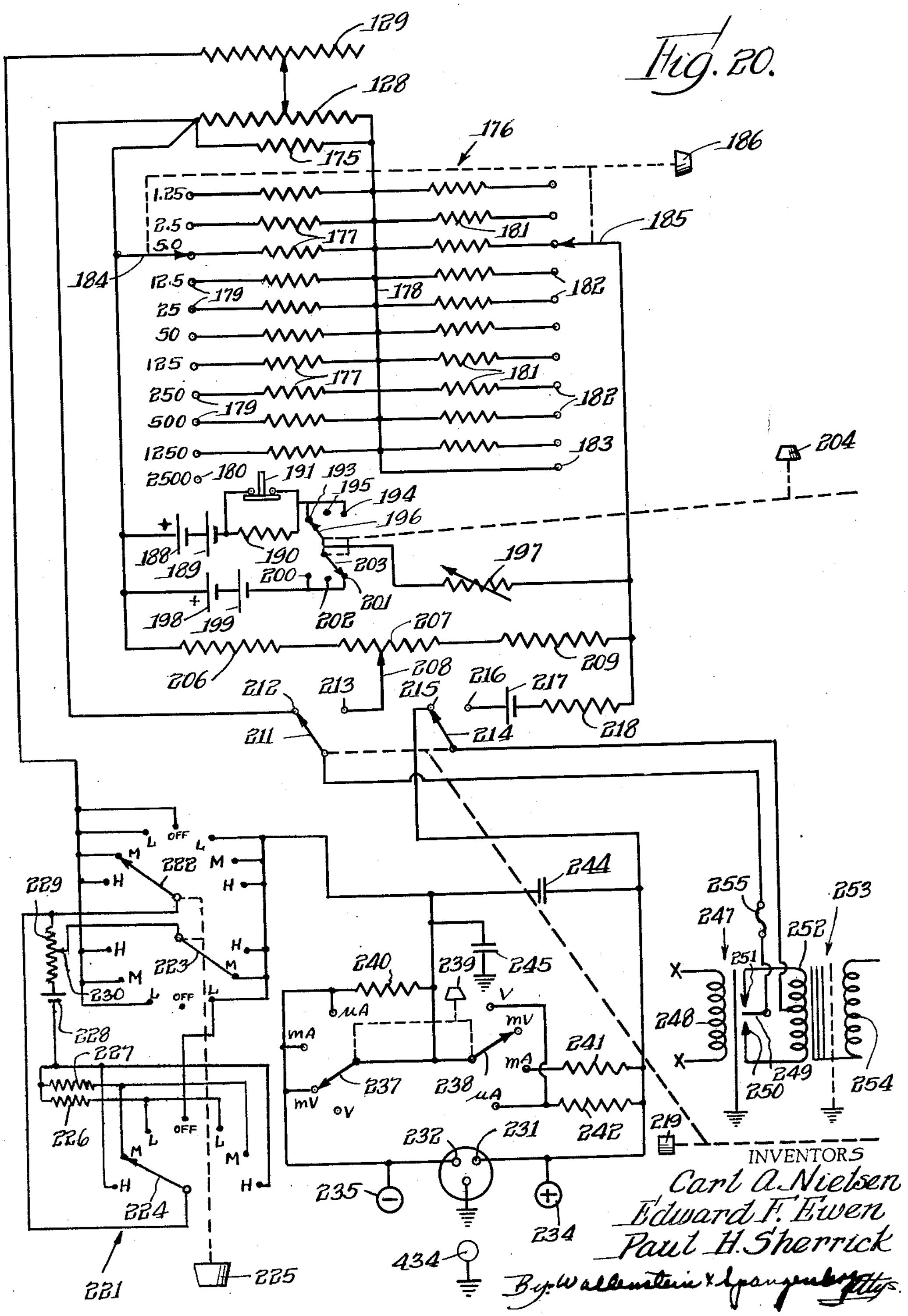
FIG. 20 is a wiring diagram of the potentiometer apparatus.
Figure 21:
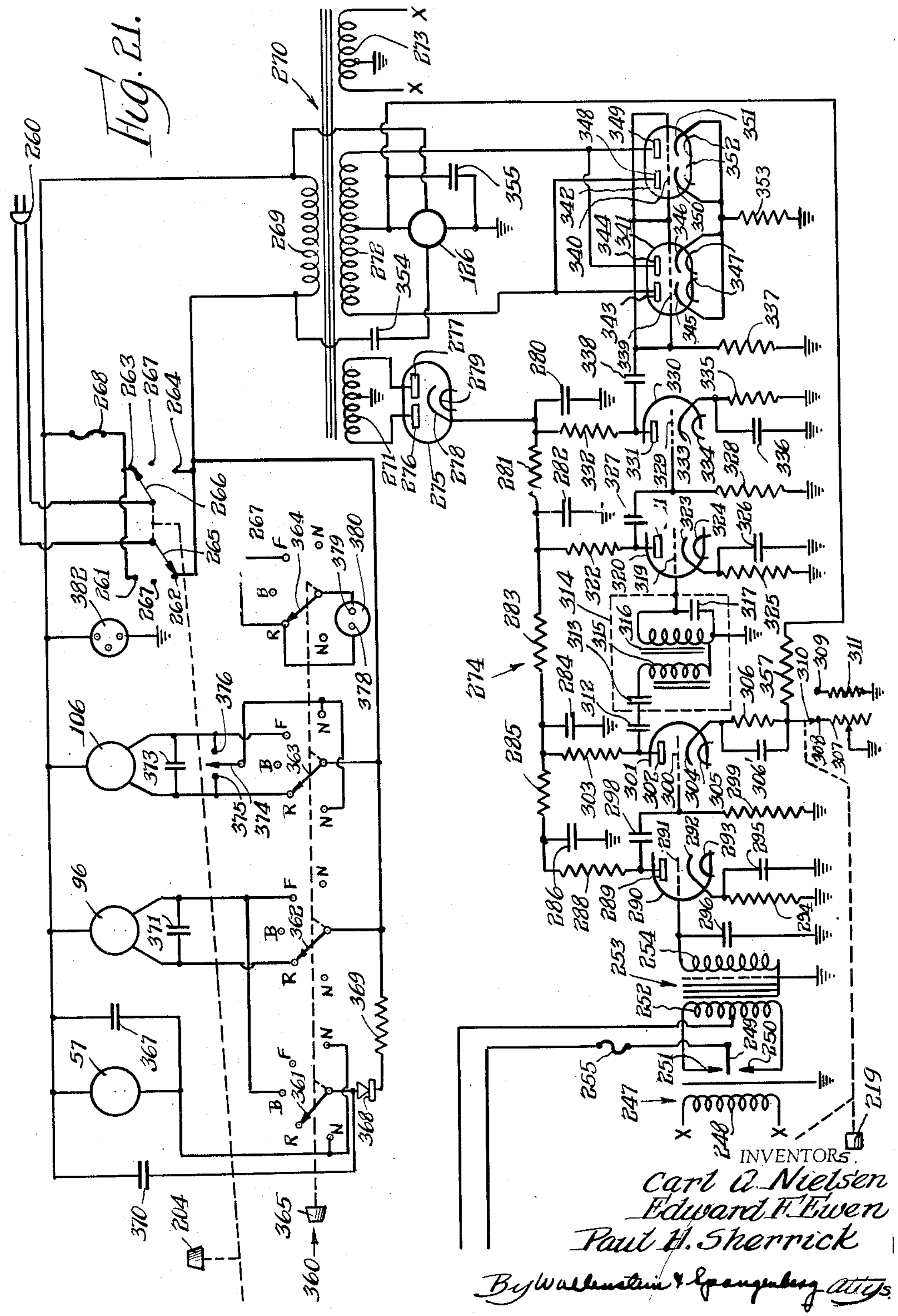
Figures 22, 23, 24, 25:
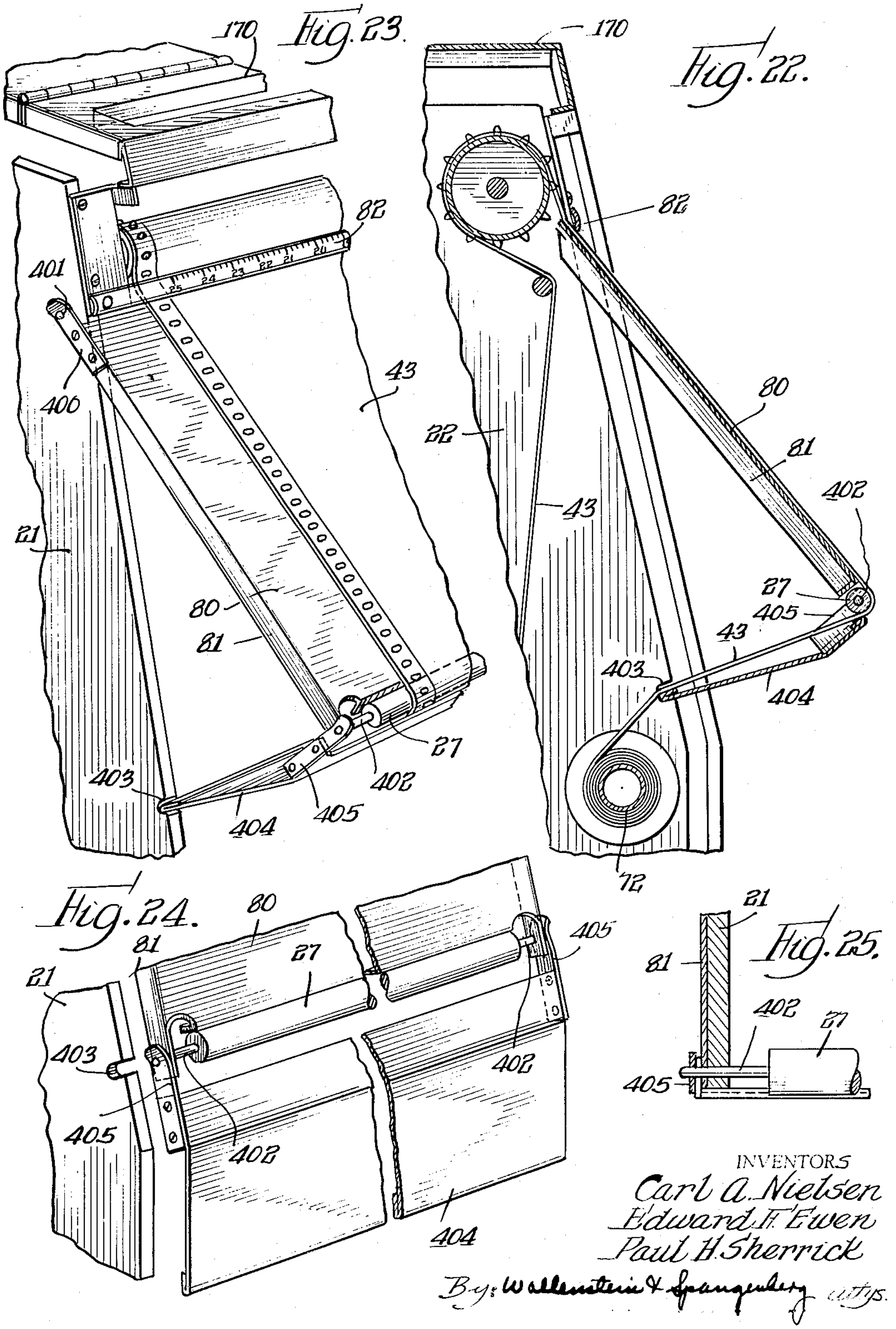
Figures 26, 27, 28, 29, 30, 31:
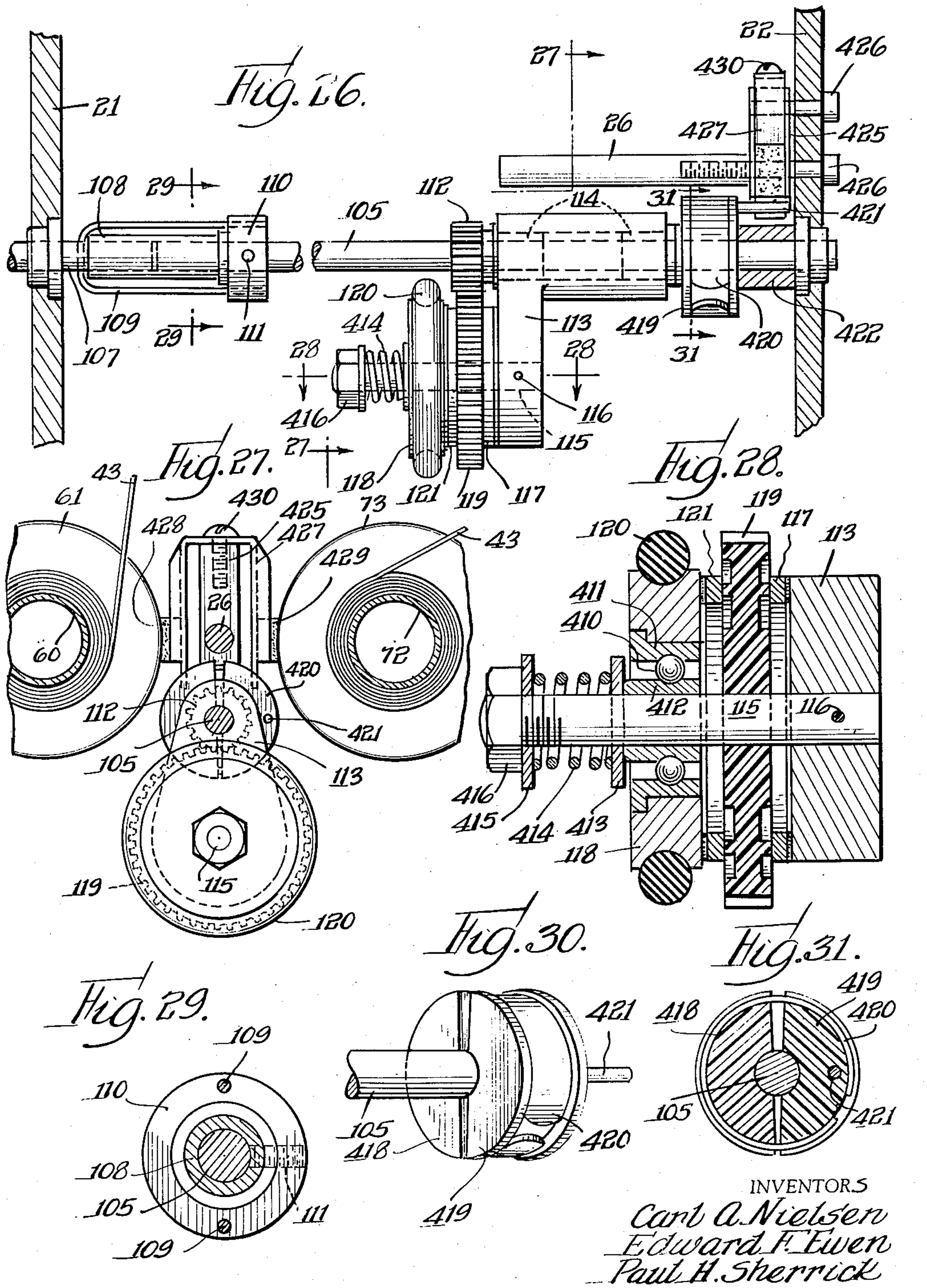
Figures 32, 33, 34, 35, 36, 37, 38, 39:
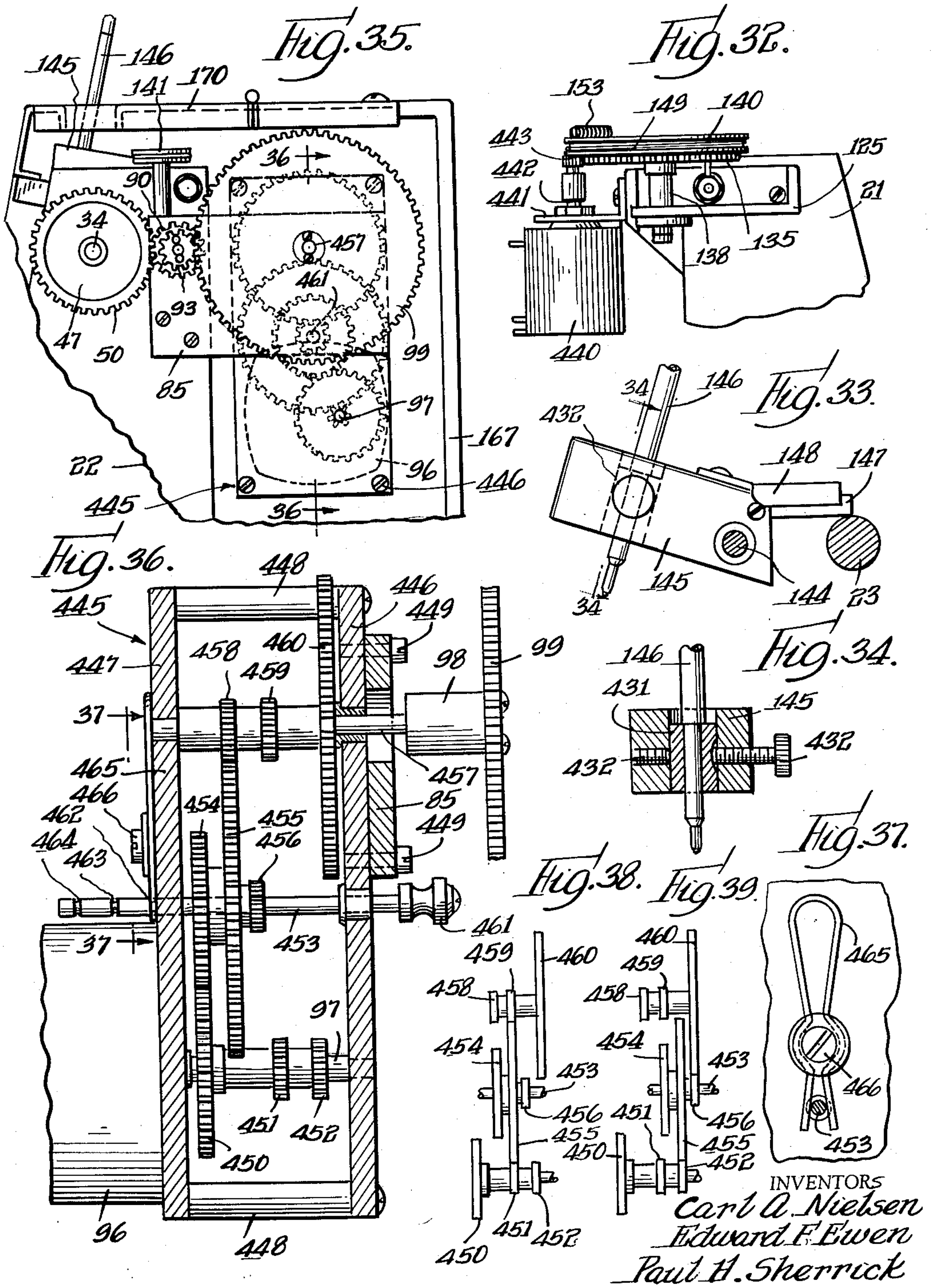

FIG. 21 is a wiring diagram of the electronic amplifier illustrating the manner in which the reversible electric motor for rebalancing the potentiometer apparatus is operated, and of the circuit arrangement for operating the electro magnetic clutch, the chart feed roll motor, and the friction drive wheel motor. This wiring diagram also includes the converter or chopper and the input transformer which is illustrated in FIG. 20 for the purpose of showing the relationships between the wiring diagrams of FIGS. 20 and 21;

FIG. 22 is a vertical sectional view taken substantially along the line 22—22 of FIG. 3 and illustrating the platen tilted outwardly;

FIG. 23 is a perspective view of a portion of the frame with the platen tilted outwardly;

FIG. 24 is a perspective view similar to FIG. 23 but illustrating the platen almost in closed position;

FIG. 25 is a sectional view through the left hand portions of FIGS. 23 and 24;

FIG. 26 is a vertical sectional view through the friction drive wheel mechanism illustrated in FIGS. 5 and 7 and taken substantially along the line 26—26 of FIGS. 4 and 7;

FIG. 27 is a vertical sectional view taken substantially along the line 27—27 of FIG. 26;

FIG. 28 is a horizontal sectional view taken substantially along the line 28—28 of FIG. 26;

FIG. 29 is a vertical sectional view taken substantially along the line 29—29 of FIG. 26;

FIG. 30 is a perspective view of the slip friction control mechanism illustrated at the right hand side of FIG. 26;

FIG. 31 is a vertical sectional view through the slip friction control mechanism and is taken substantially along the line 31—31 of FIG. 26;

FIG. 32 is a view similar to the upper portion of FIG. 6, but showing an additional slide wire mechanism for remote indicating purposes;

FIG. 33 is an enlarged view of the pen carriage as seen at the top of FIG. 7;

FIG. 34 is a sectional view through the pen carriage taken substantially along the line 34—34 of FIG. 33;

FIG. 35 is an elevational view similar to the top of FIG. 4 but illustrating the addition of an adjustable speed reducer mechanism between the chart feed roll motor and the selective gearing driven thereby.

FIG. 36 is a vertical sectional view taken substantially along the line 36—36 of FIG. 35;

FIG. 37 is a vertical sectional view taken substantially along the line 37—37 of FIG. 36;

FIGS. 38 and 39 are diagrammatic views illustrating different positions of the gears in the adjustable speed reducer mechanism.

Referring first to FIGS. 1, 3, 4 and 16, the measuring and recording instrument of this invention is generally designated at 10. It includes a hollow substantially rectangular base 11 having side walls 12 and a top wall 13. The bottom wall, which may or may not be open, is provided with a circumferential rib 14 for resting the base 11 upon a bench or the like. The front and rear walls of the base 11 are open and are, respectively, closed by panels 15 and 16. The front panel 15, which may be removably secured in place by screws 385 or the like, carries a chassis 17, which, in turn, supports and carries substantially all of the potentiometer circuit components illustrated in FIG. 20. The rear panel 16, which may be removably secured in place by suitable latches 387 or the like, carries a chassis 18 incorporating substantially all of the components of the electronic amplifier illustrated in FIG. 21. This rear panel 16 also carries the various batteries or cells utilized in the potentiometer apparatus of FIG. 20. By removing the panels 15 and 17, the various electrical components are made readily accessible for service or repair. Substantially all of the adjustments and control devices are mounted on the front panel 15 for ready access in the normal operation of the measuring and recording instrument.

The measuring and recording instrument, as more clearly shown in FIGS. 3 to 7, includes a frame 20 which extends upwardly from the top of the hollow base 11. This frame 20 includes a pair of vertically arranged spaced side plates 21 and 22, which are secured together at their tops by a rod 23, and at their bottoms by rods 24 and 25, the side plate 22 being provided with a stop pin 26. Extending between the side plates 21 and 22 is a rod 28, operating as a guide for the recording chart. The top wall 13 of the hollow base 11 is provided with three bosses, two of which, indicated at 29, underlie the rod 24, and one of which, indicated at 32, underlies the rod 25. Thus, the frame 20 has a three-point support upon the base 11. Hooks 30 receive the rods 24 and 25 adjacent the bosses 29 and 32, these hooks extending downwardly through holes in the top wall 13 of the base 11, and being provided with wing nuts 31 for clamping the rods 24 and 25 at three points against the bosses 29 and 32. Thus, the frame 20 is firmly secured at three points to the base 11 and because of this three-point fastening the building up of stresses and strains in the frame 20 is prevented.

Adjacent the top of the frame 20, a shaft 24 extends between the side plates 21 and 22 and is rotatably mounted therein by ball bearings 35. As shown more particularly in FIG. 14, the ball bearings 35 include an inner race 36 secured to the shaft 34 and a flanged outer race 37 secured to the side plate 22. The shaft 34 carries a chart feed roll 38, the feed roll including a sleeve carried by hubs 39 and 40 which, in turn, are secured to the shaft 34. The hubs 39 and 40, respectively, carry radiating pins 41 and 42, which are, respectively, received in holes 44 and slots 45 in a recording chart 43. Thus, as the chart feed roll 38 is rotated, the pins 41 and 42 cooperate with the holes 44 and slots 45 and operate to move the chart 43. Any transverse expansion and contraction of the chart 43 with respect to the feed roll 38 is permitted by the slots 45. In this respect the side of the chart 43 having holes 44 is fixed with respect to the chart feed roll 38, and the other side having the slots 45 is allowed to move laterally with respect to the feed roll 38. The upscale direction of the chart 43 is from right to left, as viewed in FIGS. 1, 3 and 5. A spring 46 arranged about the shaft 46 between the side plate 21 and the chart feed roll hub 40 maintains the chart feed roll in proper longitudinal position with respect to the frame 20.

Figures 10, 11, 12, 13, 14, 15:
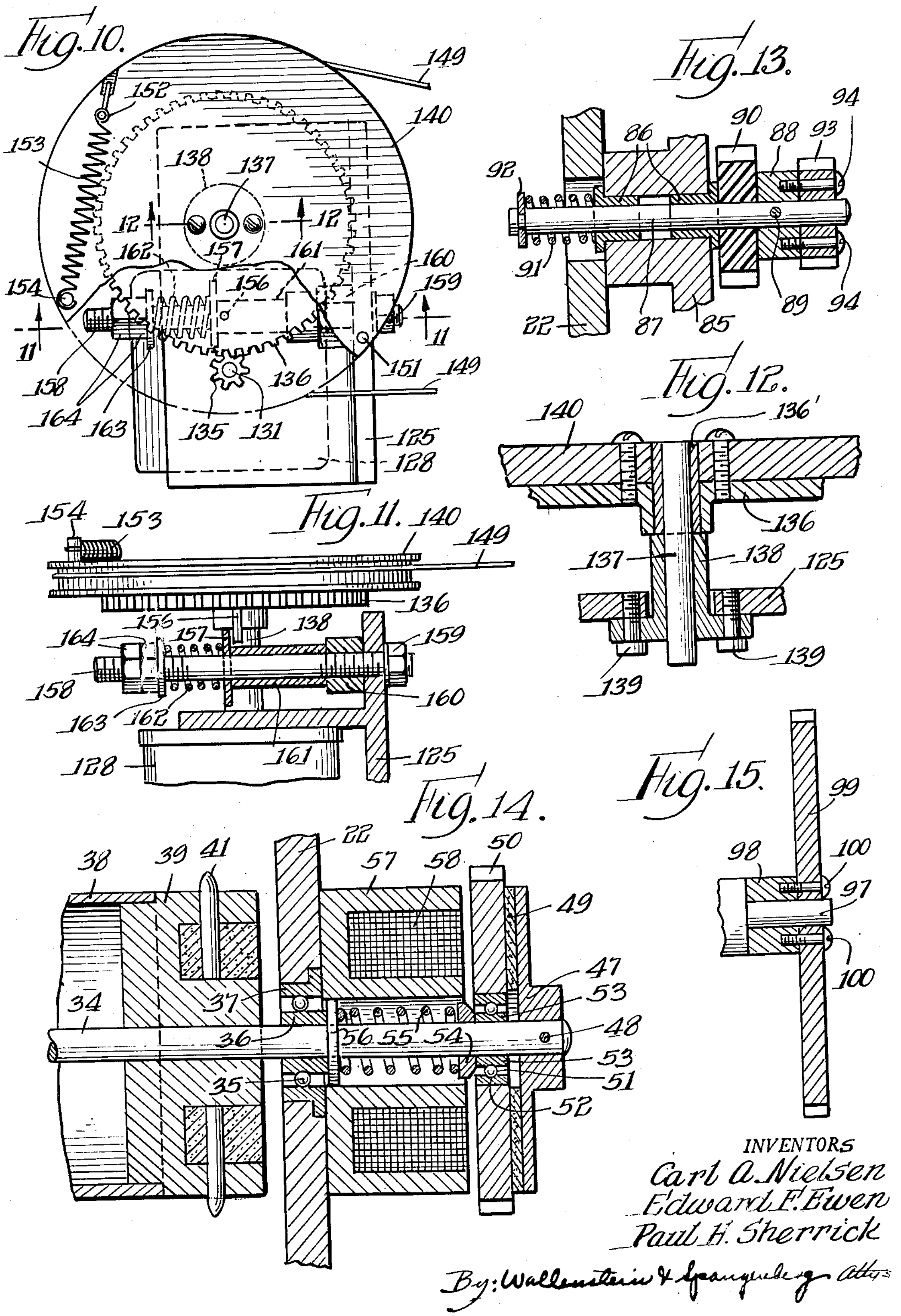
FIG. 10 is a top plan view of the mechanism utilized in driving the recording mechanism which is located at the left of FIG. 3 and the upper left hand portion of FIG. 5, and having a portion thereof broken away for clarity.
FIG. 11 is a vertical sectional view taken substantially along the line 11—11 of FIG. 10.
FIG. 12 is a vertical sectional view taken substantially along the line 12—12 of FIG. 10.
FIG. 13 is a vertical sectional view through a portion of the gear mechanism for driving the chart feed roll and is taken substantially along the line 13—13 of FIG. 4.
FIG. 14 is a vertical sectional view through the electromagnetic clutch which drives the chart feed roll and is taken substantially along the line 14—14 of FIG. 4.
FIG. 15 is a vertical sectional view through another portion of the gearing for driving the chart feed roll and is taken substantially along the line 15—15 of FIG. 4.
Figures 16, 17, 18, 19:
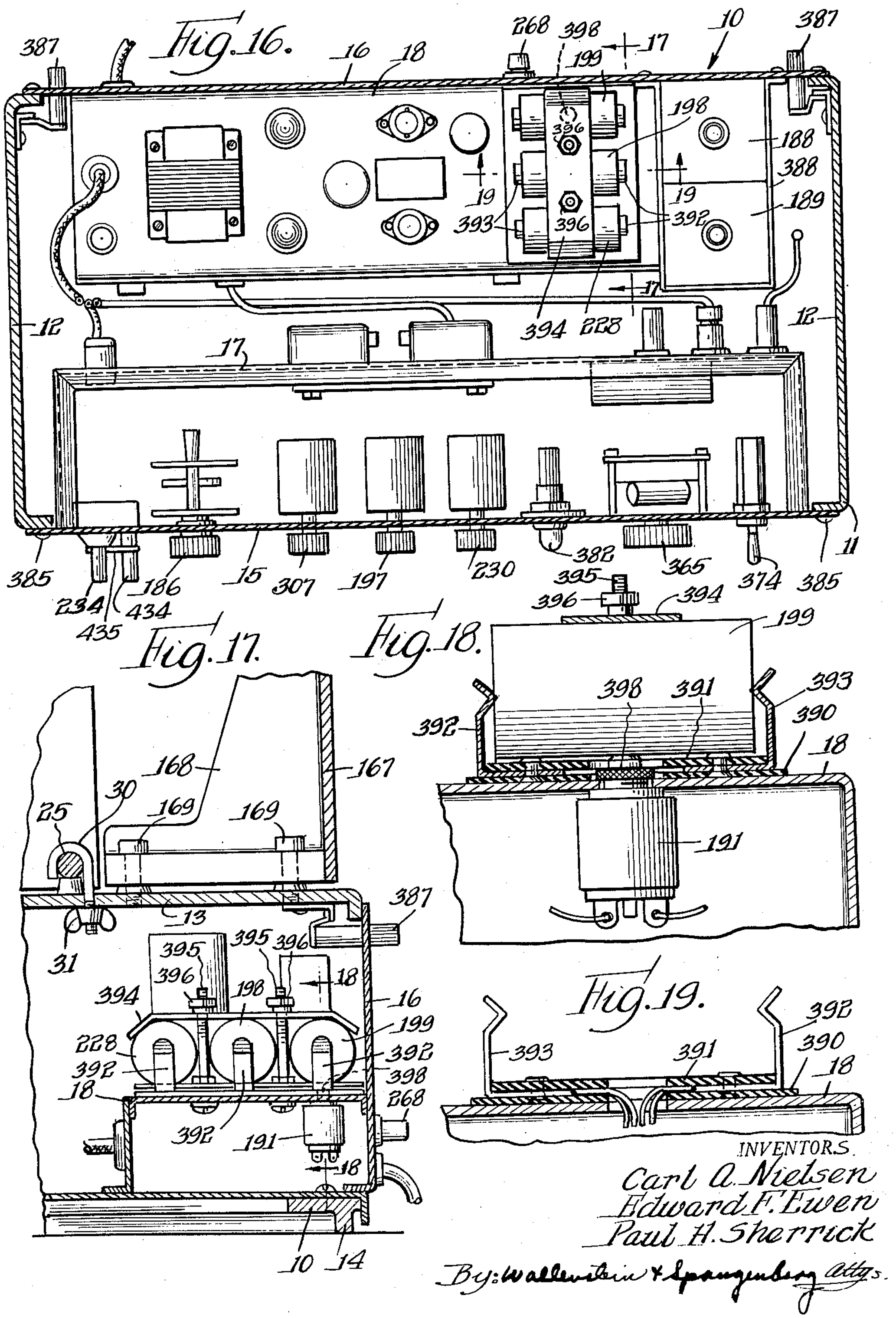
FIG. 16 is a horizontal sectional view through the hollow base of the instrument and is taken substantially along the line 16—16 of FIG. 4.
FIG. 17 is a vertical sectional view through a portion of the hollow base and is taken substantially along the line 17—17 of FIG. 16.
FIG. 18 is a vertical sectional view taken substantially along the line 18—18 of FIG. 17.
FIG. 19 is a vertical sectional view taken substantially along the line 19—19 of FIG. 16.

Referring more particularly to FIGS. 4, 5 and 14, the end of the shaft 34, which extends beyond the side plate 22, has a clutch plate 47 secured thereto by a pin 48, this clutch plate 47 carrying a friction clutch member 49. A gear 50 is rotatably mounted on the shaft 34 by a ball bearing 51 having an outer race 52 secured to the gear 50, and an inner race 53 slidably mounted on the shaft 34. A collar 54, also slidably carried by the shaft 34, is engaged by one end of a compression spring 55, the other end of which engages a washer 56 bearing against the inner race 36 of the ball bearing 35. This spring 55 operates normally to urge the gear 50 outwardly into engagement with the clutch friction member 49, so that as the gear 50 is rotated, the clutch plate 47 is rotated to rotate the chart feed roll 38. In other words, the clutch is normally engaged to drive the chart feed roll 38. Secured to the side plate 22 about the shaft 34 and spring 55, is an electro magnet 57 having an energizing coil 58. This electro magnet is preferably a D.C. electro magnet and when the operating coil 58 thereof is energized, the gear 50 is attracted against the action of the spring 55 to separate the gear 50 from the friction clutch member 49 so as to release the clutch and hence release the driving connection between the gear 50 and the shaft 34 and chart feed roll 38. Thus, when the electro magnet 57 is de-energized, the gear 50 is clutched to the shaft 34 to rotate the chart feed roll 38 and when the electro magnet 57 is energized, the gear 50 is declutched from the shaft 34, and the shaft 34 and chart feed roll 38 are permitted to rotate freely.

Figure 9:
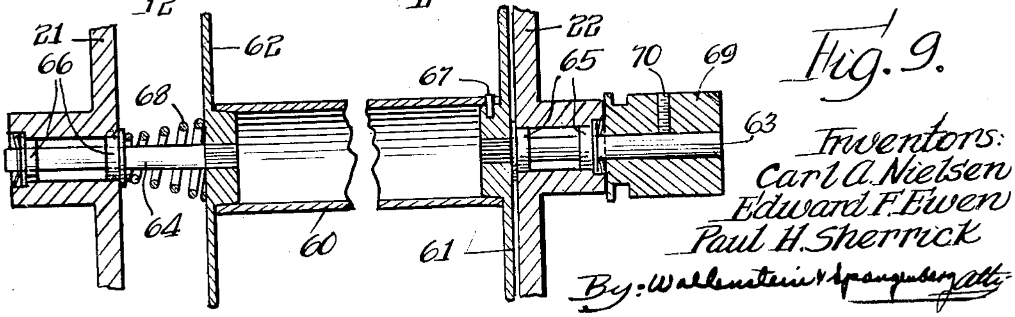
FIG. 9 is a vertical sectional view through the chart supply roll taken substantially along the line 9—9 of FIG. 7.

A chart supply roll 60 is rotatably mounted between the side plates 21 and 22 adjacent the bottom rear of the frame 20. The construction of the chart supply roll 60 and the manner in which it is rotatably mounted, is illustrated more clearly in FIG. 9. Here, the chart supply roll 60, which is the usual cardboard roll or the like, upon which the chart 43 is normally rolled, is mounted at one end upon a flanged hub 61 and at the other end upon a flanged hub 62. The flanged hubs 61 and 62 are secured to shafts 63 and 64, respectively, which, in turn, are journalled for rotation in ball bearings 65 and 66 carried by the side plates 22 and 21. The end of the chart supply roll 60, which is carried by the flanged hub 61 is provided with a notch for receiving a pin 67 secured in the flanged hub 61 for the purpose of locking the chart supply roll 60 to the flanged hub 61. The flanged hub 61 bears against a washer on the shaft adjacent the bearing 65 and is maintained there-against by a spring 68 disposed between the flanged hub 62 and a washer on the shaft adjacent the bearing 66 carried by the side plate 21. This construction, therefore, provides proper alignment of the chart supply roll 60 with respect to the chart feed roll 38. To apply or remove the chart supply roll 60 to and from the flanged hubs 61 and 62, all that is necessary is to move the flanged hub 62 outwardly towards the side plate 21 against the action of the spring 68. The chart supply roll 60 may be manually rotated by a knob 69 secured to the outer end of the shaft 60 by a set screw 70 or the like.

A chart take-up roll 72 is rotatably mounted between the side plates 21 and 22 adjacent the bottom front of the frame 20. Here, also, the chart take-up roll 72 may be the conventional cardboard roll for the chart 43 and it is carried by flanged hubs 73 and 74 which, in turn, are carried by shafts 75 and 76 also mounted for rotation in suitable ball bearings carried by the side plates 22 and 21. The construction of the mounting for the chart take-up roll 72 is substantially the same as that described above with respect to the chart supply roll 60 and it also includes a spring 77 for maintaining proper alignment of the chart take-up roll 72 with respect to the chart feed roll 38. Here, also, the shaft 75, carrying the flanged hub 73, is provided at its outer end with a knob 78 to form a means for manually rotating the chart take-up roll 72.

A platen 80 extends between the side plates 21 and 22 and is provided with edge flanges 81 overlying the side plates, the platen 80 being more clearly illustrated in FIGS. 23 to 25. The upper ends of the edge flanges 81 are provided with spring clips 400 which receive pins 401 carried by the side plates 21 and 22 for tiltably and removably mounting the platen 80 at its upper end to the side plates 21 and 22. The lower end of the platen 80 is provided with a rod 27 having pins 402 extending through holes in the edge flanges 81, the rod 27 acting as a guide bar for the chart. The pins 402 are received in slots 403 in the side plates 21 and 22 for guiding the platen when the platen is swung to closed position. An apron 404 is arranged below the platen 80 and is provided with a pair of spring clips 405 receiving the pins 402 for swingably and removably attaching the apron 404 to the bottom of the platen 80. When the platen 80 is swung outwardly, as illustrated in FIGS. 22 and 23, the lower end of the apron 404 is received within the notches 403 in the side plates 21 and 22 for holding the platen in tilted position. When the platen is so tilted it provides a convenient table to assist in writing notations upon the chart.

The chart 43 extends from the chart supply roll 60 over the rod 28, over the chart feed roll 38, over the platen 80 and over the rod 27 to the chart take-up roll 72. Thus, as the chart feed roll 38 is rotated in a forward direction, the chart is fed from the chart supply roll 60 to the chart take-up roll 72. When the chart feed roll 38 is rotated in a rearward direction, the chart is fed from the chart take-up roll 72 to the chart supply roll 60. The platen 80, which is arranged behind the chart 43 at the front of the instrument, provides a tiltable backing for the chart so that suitable notations may be inscribed upon the chart, if this be desired. A chart tearoff bar 82, having graduations corresponding to the graduations on the chart, is arranged across the chart above the platen 80 and is removably secured at its ends to the side plates 21 and 22. This chart tearoff bar 82 provides a means whereby the chart may be torn off, if this be desired.

The side plate 22 carries a bracket 85 behind the electro magnetic clutch 57, and this bracket 85, as shown more clearly in FIG. 13, is provided with bearings 86 for rotatably mounting a shaft 87. A collar 88 is secured to the shaft 87 by a pin 89, and a gear 90 is secured to the collar 88. This gear 90 meshes with the gear 50 for driving the chart feed roll 38 through the electro magnetic clutch. A spring 91 interposed between one of the bearings 85 and a self-locking nut 92 carried by the shaft 87 maintains the gear 90 against the outer bearing 86 in proper alignment with the gear 50. The collar 88 removably carries a gear 93 by means of screws 94.

The bracket 85 also carries a reversible electric motor 96 which is preferably a synchronous capacitor motor, such as a Bodine KYC–23 or Borg 1003–45Y motor, which has a shaft 97 driven at a speed of 1 r.p.m. As shown more clearly in FIG. 15, the motor shaft 97 has a hub 98 secured thereto, and screws 100 removably securing a gear 99 to the hub 98. The gear 99 meshes with the gear 93 so that as the electric motor is operated in one direction or the other, it operates through the gears 99, 93, 90, 50 and the electro magnetic clutch to rotate the chart feed roll 38 in one direction or the opposite direction. The gears 93 and 99 are interchangeable gears, and by proper selection of ratios between the gears 93 and 99, the chart feed roll 38 may be driven at any desired selected speed, as for example, speeds of ⅓, ½, 1, 1½, 2, 2¾, 4, 8 and 12 inches per minute. The interchangeable gears 93 and 99, which are not in use, may be mounted on a vertically extending pin 101 carried by the top wall 13 of the base 11 just outside of the side plate 22. In this way, the interchangeable gears which are not in use may be conveniently stored within the instrument.

Rotatably mounted between the side plates 21 and 22 and between the chart supply roll 60 and the chart take-up roll 72 adjacent the bottom of the frame 20, is a shaft 105, this shaft 105 being driven by a reversible electric motor 106 secured to the side plate 21. This reversible electric motor 106 is preferably a reversible capacitor induction motor such as a Bodine KCI-23RB or Borg 1007-45Y motor, and it operates to rotate the shaft 105 in one direction or the other at a speed of substantially 140 r.p.m.

As shown more clearly in FIGS. 5 and 26, the reversible electric motor 106 drives a stub shaft 107 rotatably mounted by a ball bearing in the side plate 21. The outer end of the shaft 105 is rotatably mounted in a ball bearing in the side plate 22 and the inner end of the shaft 105 abuts the stub shaft 107. A sleeve 108 rotatably encompasses the ends of the shafts 105 and 107 for supporting the same and keeping the same in axial alignment. A U-shaped spring 109 is received in a hole in the stub shaft 107 and extends along the sleeve 108, the ends of the spring 109 being received in holes in a collar 110 secured to the shaft 105 by a screw 111. Thus, as the shaft 107 is rotated by the reversible electric motor 106, the shaft 105 is resiliently driven by means of the U-shaped spring 109.

A pinion 112 is secured to the shaft 105 and a carrier 113 is rotatably mounted by bearings 114 on the shaft 105 adjacent the pinion 112. The carrier 113 has a stub shaft 115 secured thereto by a pin 116, the carrier 113 having a ring 17 of hardened steel suitably secured thereto as by cementing. A friction drive wheel 18 is rotatably mounted on the stub shaft 115 and it also has secured thereto, as by cementing or the like, a hardened steel ring 121. A gear 119 meshing with the pinion 112 is rotatably mounted on the stub shaft 115 between the rings 117 and 121 secured to the carrier 113 and the friction drive wheel 118, respectively. The friction drive wheel 118 is provided with a resilient rim 120 formed of rubber or the like, which is adapted to engage the chart 43 on either the chart supply roll 60 or the chart take-up roll 72. The gear 119 is preferably formed from nylon and is grease-packed to provide desired frictional characteristics between the gear 119 and the hardened steel rings 117 and 121 secured to the carrier 113 and friction drive wheel 118.

The friction drive wheel 118 is rotatably mounted on the stub shaft 115 by a ball bearing 410 having an outer race 411 secured to the friction drive wheel and an inner race 412 slidably mounted on the stub shaft 115. Washers 413 and 415 are located on the stub shaft 115 and a spring 414 is interposed between these washers, the spring 414 being backed up by a nut 416 threaded on the stub shaft 115. The spring 414 operates through the washer 413 against the inner race 412 of the ball bearing 410 for pressing the ring 121 of the friction drive wheel against the gear 119 and for pressing the gear 119 against the ring 117 of the carrier 113 to provide slip friction driving means for the carrier 113 and the friction drive wheel 118. The rings 117 and 121 therefore act equally upon the gear 119 and by appropriately adjusting the compression in the spring 414 proper frictional drive is provided for driving the chart 43 and for rotating the carrier 113 about the shaft 105 to engage the friction drive wheel 118 with the chart 43 on the chart supply roll 60 or the chart take-up roll 72.

When the reversible electric motor 106 is operated to drive the shaft 105 in a forward direction, a clockwise direction as viewed in FIGS. 4 and 7, and a counterclockwise direction as viewed in FIG. 27, the carrier 113 is rotated about the shaft 105 to cause the friction drive wheel 118 to engage the chart 43 on the chart take-up roll 72, and the pinion 112 drives the gear 119 and hence drives the friction drive wheel 118 to rotate the chart take-up roll 72 in a forward direction to wind the chart upon the chart take-up roll. When, however, the reversible electric motor 106 is operated in the opposite direction to drive the shaft 105 in the rearward or counterclockwise direction as viewed in FIGS. 4 and 7, or in a clockwise direction, as viewed in FIG. 27, the carrier 113 is rotated about the shaft 105 to cause the friction drive wheel 118 thereof to engage the chart 43 on the chart supply roll 60, and also rotates the pinion 112, gear 119 and friction drive wheel 118 in the opposite or rearward direction to rotate the chart supply roll 60 in a rearward direction to wind the chart upon the chart supply roll.

A slip friction mechanism, consisting of two semi-circular parts 118 and 119, is mounted on the shaft 105 adjacent the carrier 113. The two parts 418 and 419 are held together and are pressed against the shaft 105 by a spring clip 420. As the shaft 105 is rotated in one direction or the opposite direction, the slip friction mechanism is frictionally driven in said directions. The various parts are maintained in proper position along the shaft 105 between the pinion 112 and the side plate 22 by a spacer sleeve 422. The part 419 of the slip friction mechanism carries a pin 421 for selectively actuating a brake mechanism for the chart supply roll 60 and the chart take-up roll 72.

The brake mechanism includes a bracket 425 which is secured by screws 426 to the side plate 22, one of the screws 426 carrying the stop rod 26 for the carrier 113. A U-shaped leaf spring 427 is secured by a screw 430 to the bracket 425, the arms of the leaf spring 427 carrying brake shoes 428 and 429 normally engaging the flanges 61 and 73 of the chart supply roll 60 and the chart take-up roll 72, respectively. The pin 421 on the slip friction mechanism engages one or the other of the legs of the leaf spring 427 for releasing the brake shoe 428 or the brake shoe 429.

When the shaft 105 is rotated in one direction for driving the chart supply roll 60, the pin 421 engages the leaf spring 427 to release the brake 428 from the hub 61 of the chart supply roll 60 so that the chart supply roll 60 may be properly driven. At this time the brake shoe 429 engages the hub 73 of the chart take-up roll 72 for maintaining tension in the chart 43. When the shaft 105 is rotated in the opposite direction by the reversible electric motor 106 to rotate the chart take-up roll 72, the pin 421 on the slip friction mechanism engages the leaf spring 427 to release the brake shoe 429 from the hub 73 of the chart take-up roll so that the chart take-up roll 72 may be properly driven. At this time the brake shoe 428 is engaging the hub 61 of the chart supply roll 60 to maintain proper tension in the chart 43.

As the shaft 105 is rotated in one direction or the opposite direction by the reversible electric motor 106, the U-shaped spring 109, connecting the shaft 107 to the shaft 105, is flexed to cause the shaft 105 to lag behind the shaft 107. When the reversible electric motor is de-energized, the U-shaped spring 109 operates to rotate the motor 106 in the direction opposite to the direction in which it had been operating by reason of the spring pressure built up in the spring. As the motor is so rotated by the spring 109, it coasts beyond the position where the spring pressure in the spring 109 becomes neutral and, as a result, carries with it the shaft 105 to move the carrier 113 to its mid-position and to move the pin 421 of the slip friction mechanism away from the spring arms 427 carrying the brake shoes 428 and 429. Thus, when the reversible electric motor is de-energized, the friction drive wheel 118 is positively moved out of engagement with the chart supply roll 60 and the chart take-up roll 72 and the brake shoes 428 and 429 engage the hubs 61 and 73 of those chart rolls so as to maintain the chart tightly wound on those chart rolls even though the chart rolls are rotatably supported by ball bearings to provide the minimum amount of friction against rotation when rotation is desired.

When the chart feed roll 38 is operated in the forward direction through the electro magnetic clutch 57 by the reversible motor 96 to feed the chart 43 from the chart supply roll 60 to the chart take-up roll 72, the reversible electric motor 106 is also operated in a forward direction to engage the friction drive wheel 118 with the chart on the chart take-up roll 72 to rotate he chart take-up roll in the forward or clockwise direction. The electric motor 106 operates normally to drive the friction drive wheel 118 at a much faster rate than the rate of chart feed by the chart feed roll 38 and due to the friction connection between the gear 119 and the friction drive wheel 118, the friction drive wheel 118 operates to tension the chart 43 between the chart feed roll 38 and the chart take-up roll 72, the chart between the chart supply roll 60 and the chart feed roll 38 being tensioned by the brake shoe 428. Likewise, when the chart feed roll 38 is operated in the rearward direction by the reversible electric motor 96 through the electro magnetic clutch 57 to feed the chart 43 from the chart take-up roll 72 to the chart supply roll 60, the reversible electric motor 106 is operated in the opposite or rearward direction to move the friction drive wheel 118 into engagement with the chart 43 on the chart supply roll 60 to drive the chart supply roll 60 in a counterclockwise direction. Here, again, the friction drive between the gear 119 and the friction drive wheel 118 causes the friction drive wheel 118 to tension the chart between the chart feed roll 38 and the chart supply roll 60, the chart between the chart take-up roll 72 and the chart feed roll 38 being tensioned by the brake shoe 429. When, however, the electromagnet 57 of the clutch is energized to release the clutch for the chart feed roll 38, the chart feed roll becomes "free wheeling" and the chart is driven in one direction or the other by the electric motor 106 through the friction drive wheel 118. When this occurs, there is no substantial slipping of the friction drive wheel 118 with respect to the gear 119 so that the friction drive wheel 118 is operated at maximum speed to move the chart in one direction or the other at a considerably greater speed than it is moved by the chart feed roll 38, as, for example, 20 feet per minute. When the reversible electric motor 106 is operated in a forward direction under these conditions, the chart is advanced from the chart supply roll to the chart take-up roll at a rapid rate and conversely when the reversible electric motor 106 is operated in the opposite or rearward direction, the chart 43 is driven at a rapid rate from the chart take-up roll 72 to the chart supply roll 60. Thus, the friction drive wheel 118 operates, when the chart feed roll 38 is operated through the clutch, to tension the chart, regardless of direction of the chart feed, and it also operates when the electromagnetic clutch is released to drive the chart in a forward or a rearward direction at a rapid rate. There is, thus, provided a chart drive arrangement having great versatility, which is particularly adaptable for use in a recording instrument utilized for analytical or testing work in scientific laboratories or the like.

As shown more clearly in FIGS. 3, 5, 6, 10 and 11, a bracket 125 is secured to the side plate 21 of the frame 20. Secured to the bottom of this bracket is a reversible electric motor 126 which is preferably a two-phase capacitor induction motor, such as a Bodine KLI-24RB motor. This is the motor which is controlled by the electronic amplifier and which operates to rebalance the potentiometer circuit and to operate the recording mechanism. This motor operates to rotate the motor shaft 127 at a speed of substantially 325 r.p.m. Also mounted upon the bracket 125 above the reversible electric motor 126, is a slide wire assembly having a slide wire section 128 and a collector section 129. The upper slide wire section 128 is a ten-turn potentiometer consisting of about 3500 convolutions of manganin wire with a total resistance of about 300 ohms, which is wound on an insulated copper mandrel. This winding is shunted with a precision resistor 175 of about 1500 ohms, so that the series equivalent resistance of the ten-turn winding and the shunt is about 250 ohms±0.1 percent. The bottom or collector section 129 is identical to the top section with the exception that the winding is wound on a bare copper mandrel so that its resistance is practically zero. The thermal E.M.F. developed between the brush and the winding is equal and opposite to that of the top section 128 and, consequently, they cancel. The brushes used for both sections 128 and 129 are preferably made of a gold alloy, which is soft enough to prevent excessive wear on the windings. The brushes are rotated with respect to the windings in the sections 128 and 129 by a shaft 131, which extends upwardly and downwardly from the slide wire assembly. The lower end of the slide wire assembly shaft 131 is arranged in substantial alignment with the motor shaft 127. The motor shaft 127 drives the slide wire assembly shaft 131 through an overlapping connection consisting of a fitting 132 secured to the shaft 127 and provided with a flat surface which engages a flat surface on a fitting 133 secured to the shaft 131. An appreciable clearance is provided between the flat surfaces of the overlapping connection to accommodate any possible misalignment which may exist between the shaft 127 and 131. Thus, as the electric motor 126 is operated in one direction or the other, the slide wire assembly 128, 129 is correspondingly operated.

The upper end of the slide wire assembly shaft 131 carries a pinion 135 which meshes with a gear 136 rotatable on a vertical shaft 137. As shown more clearly in FIG. 12, this shaft 137 is secured to a bracket 138 which, in turn, is secured to the bracket 125 by screws 139. Also rotatably mounted on the shaft 137 and secured to the gear 136 is a drum 140 which is utilized for operating the recording mechanism. The gear 136 and drum 140 may be journalled on the shaft 137 by a suitable bearing 136'. On the opposite side of the instrument, as shown more clearly in FIGS. 3, 4 and 5, is a pulley 141 rotatably carried by a shaft secured in a bracket 142 carried by the bracket 85. The forward edge of the pulley 141 is in substantial transverse alignment with the forward edge of the drum 140.

Located and extending between the side plates 21 and 22 above the chart feed roll 38 is a guide bar 144 upon which is slidably mounted a pen carriage 145 of a recording mechanism. The pen carrier 145 removably carries a pen 146, such as a ball point pen, which normally rests upon the chart 43 where it engages the chart feed roll 38. The weight of the pen carriage 145 normally urges the same toward the chart feed roll 38 to provide proper pressure for the engagement of the pen 146 on the chart. The pen carriage 145 carries a pair of magnetic fingers 147 which extend rearwardly above the rod 23 so that when the carriage 145 is tilted rearwardly to lift the pen 146 from the chart, it is magnetically held in this rearwardly tilted position by the magnetic action between the fingers 147 and the rod 23. This magnetic action also operates to prevent the carriage 145 from falling against the chart when the pen 146 is removed from the carriage. The carriage 145 is also provided with a clip 148 for securing the same to a cable 149 which extends over the drum 140 and the pulley 141. To accommodate variations in diameters of the pen 146, the pen carriage 145 is provided with adapter bushings 431 which are held in place by set screws 432, as shown in FIGS. 33 and 34.

One end of the cable 149 is secured to the drum 140 at point 151 and the cable extends from the drum 140 over the pulley 141 and back to the drum 140 and at least partially therearound. The other end of the cable extends through a slot in the side of the drum and is connected at 152 to one end of a coil spring 153, the other end of which is secured to a pin 154 carried by the drum 140. When the pen carriage is completely down scale, that is, to the right, as illustrated in FIGS. 3 and 5, the end of the cable at 151 is adjacent the front of the instrument and when the pen carriage is moved completely up scale the other end of the cable at 152 is adjacent the rear of the instrument, as illustrated in FIG. 10. At all times, there is substantially one complete turn of the cable 149 on the drum 140. The spring 153 is utilized for maintaining tension in the cable so that the pen carriage 145 is at all times moved accurately with respect to the movement of the drum 140 by the reversible electric motor 126.

The bottom of the gear 136 carries a pin 156 which is adapted to engage an abutment member 157 when the pen carriage is moved to its extreme up scale position so as to provide a positive but yet resilient stop for the pen carriage. The abutment member 157 is slidably mounted on a stud 158 secured by nuts 159 and 160 to the bracket 125. The stud 158 carries a sleeve 161 against which the abutment member 127 is urged by a spring 162. Preferably, the sleeve 161 is made of plastic or the like. The spring 162 is backed up by a washer 163 and nuts 164 secured to the stud 158. Thus, when the gear 136 is rotated to drive the pen up scale, the pin 156 engages the abutment member 157 when the pen carriage reaches the extreme up scale position to provide a resilient stop for the gear 136, and to prevent over-travel of the pen carriage.

Figures 1, 2:
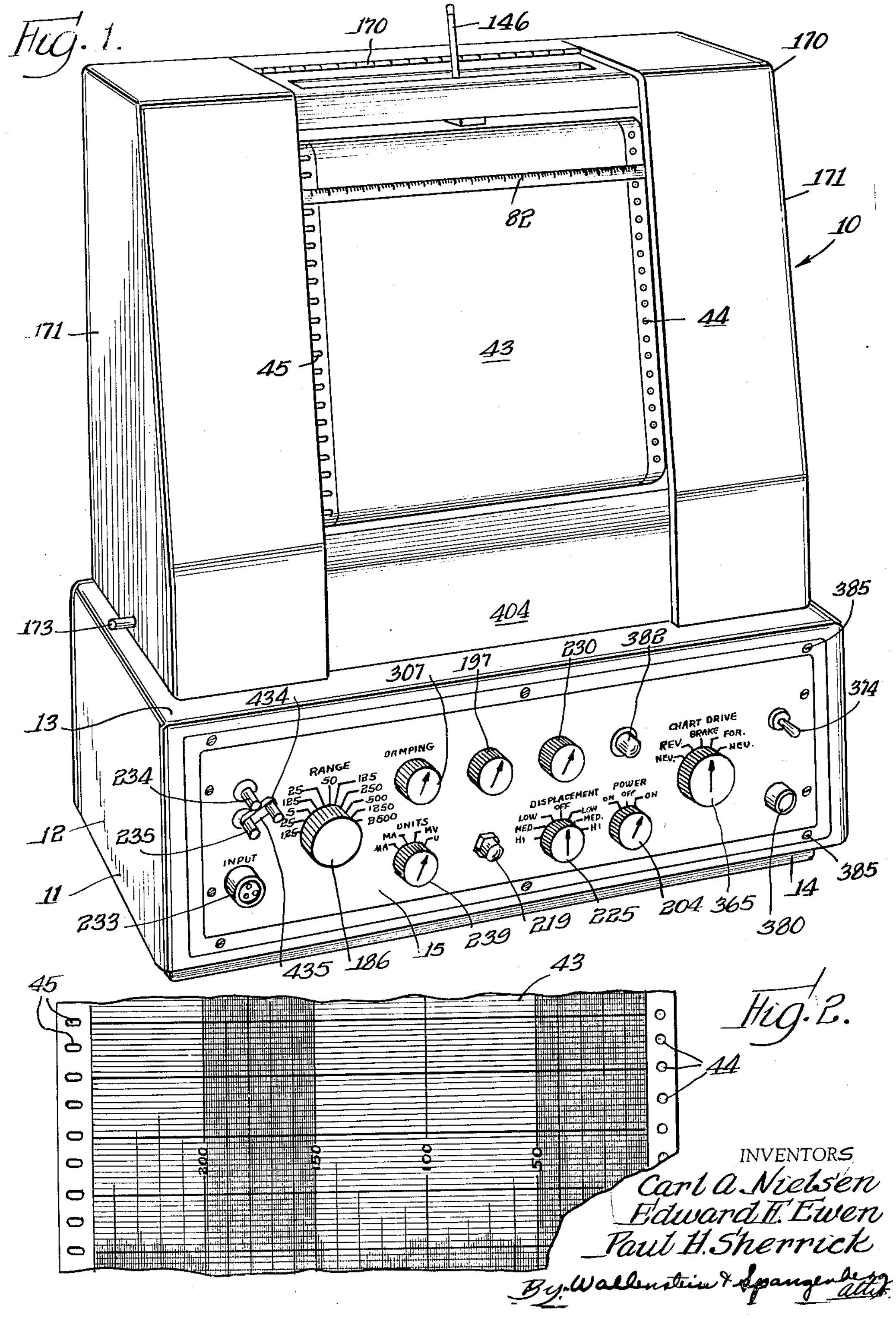
FIG. 1 is a front perspective view of the measuring and recording instrument of this invention.
FIG. 2 is a partial view of a recording chart utilized in the measuring and recording instrument illustrated in FIG. 1.

Referring to FIGS. 1, 3 and 4, the frame 20 and the various elements carried thereby, are enclosed within a housing 167, which is provided with internal ribs 168 by which the housing is secured by screws 169 to the top wall 13 of the hollow base 11. The top of the housing has a removable and hinged top cover 170, which has a slot therein for accommodating the pen 146. The sides 171 of the housing are pivotally mounted to the back wall of the housing by means of pivot pins 172 so that the housing sides may be swung open about the pivot pins to provide ready access to the frame and the various elements carried thereby. The sides 171 of the housing may be releasably secured in closed position by suitable latches 173. The front of the housing, between the sides 171, is open so as to expose the chart 43 so that the recorded information thereon may be observed and so that suitable markings may be manually applied to the chart, if this be desired. The sides 171 of the housing extend outwardly from the side plates 21 and 22 of the frame, and provide storage space in which the interchangeable gears 93 and 99 may be stored when not in use, and in which other items, such as replacement pens and the like, may also be stored.

FIG. 20 is a wiring diagram of the potentiometer apparatus which measures the conditions to be recorded by the recording mechanism on the chart, and it includes the slide wire assembly described above, including the side wire winding 128 and the collector winding 129, which are bridged by contacts which, in turn, are operated by the reversible electric motor 126. As expressed above, the slide wire winding 128 is shunted with a resistor 175 so that the series equivalent resistance thereof is 250 ohms ±0.1 percent. Associated with the slide wire 128 is a multiple range control mechanism generally designated at 176, this mechanism including a plurality of shunt resistances 177 connected at one of their ends to a conductor or bus 178, and at their other ends to contacts 179 of a multiple switch device having a blank contact at 180. It also includes a plurality of series resistors 181 which are connected at one of their ends to the conductor or bus 178, and at their other ends to contacts 182 of the multiple switch device, also having a contact 183 which is connected to the conductor or bus 178. The multiple switch device includes a contactor 184 which is adapted to selectively engage the contacts 179 and 180, and a contactor 185 which is adapted to selectively engage the contacts 182 and 183. These contactors 184 and 185 are simultaneously operated through a suitable mechanical connection by a knob 186. As the contactors 184 and 185 are progressively moved downwardly, they cut into the potentiometer circuit, the resistances 177 and 181, and when the contactors are in their lower end position, the contactor 184 engages the contact 180 and the contactor 185 engages the contact 183. The conductor or bus 178 is connected to one side of the slide wire 128, the contactor 184 is connected to the other end of the slide wire 128 and the plus side of the voltage source for the slide wire, and the contactor 185 is connected to the minus side of the voltage source for the slide wire. The resistors 177 and 181 act as selective voltage dividers for regulating the voltage across the slide wire 128 to adapt the potentiometer apparatus to various full scale ranges, which ranges are identified as 1.25, 2.5, 5.0, 12.5, 25, 50, 125, 250, 500, 1250 and 2500. These designations represent the relative voltage or current input ranges to the potentiometer circuit for driving the recording mechanism completely across the chart, that is, full scale ranges. As an example, the resistance values of the resistors 177 in a downward direction are .1231, .2483, .4990, 1.254, 2.523, 5.100, 13.16, 27.78, 62.50 and 250.0 The corresponding resistance values for the resistors 181, for example, are 249.88, 249.75, 249.5, 248.75, 247.5, 245.0, 237.5, 225.0, 200.0 and 125.0. When the contactors 184 and 185 are moved to the downward position so that they engage the contacts 180 and 183, respectively, there is no shunting of the slide wire and there is no resistance in series therewith, so that maximum voltage is applied to the slide wire 128. As the contactors 184 and 185 are progressively moved upwardly, the slide wire is shunted with decreasing resistance and the resistance in series with the slide wire is increased. By appropriately positioning the contactors 184 and 185 through the knob 186, any selected range of operation of the instrument may be obtained.

Voltage is supplied to the slide wire 128 by a pair of high current batteries or cells 188 and 189 connected in series, and these batteries or cells 188 and 189 may be conventional Burgess 4F cells or the equivalent, having a terminal voltage of 1.55 volts, each for a total of about 3.1 volts. A dropping resistor 190 is connected in series with the batteries 188 and 189, and this dropping resistor is shunted by a switch 191, which is normally closed, but which is opened when a plunger operating the switch is depressed. The shunt connected resistance 190 and switch 191 are connected to contacts 193 and 194 of a three-position switch having an intermediate dead contact 195 and a switch arm 196 adapted selectively to engage the contacts 193, 195 and 194. This switch arm 196 is connected through a standardizing control rheostat 197, which, in turn, is connected to the contactor 185.

Voltage is also supplied across the slide wire 128 by a pair of low current constant voltage batteries or cells 198 and 199, connected in series. These batteries or cells 198 and 199 may be Mallory RM42R mercury cells, each having a terminal voltage of about 1.35 volts. The 2.7 volts developed by these cells is extremely stable under low current drain. The plus side of the batteries or cells 198 and 199, as well as the plus sides of the battery cells 188 and 189, are connected to one side of the slide wire 128. The minus sides of these batteries or cells 198 and 199 are connected to contacts 200 and 201 of a three-position switch having an intermediate dead contact 202 and a switch arm 203. The switch arm 203 is also connected to the standardizing rheostat 197. The switch arms 196 and 203 are simultaneously operated by a knob 204 and when the switch arms are moved to either end position, the batteries 188, 189, 198 and 199 are connected across the slide wire 128. When the switch arms 196 and 203 are moved to the intermediate "off" position, these connections are broken so that there will be no drain upon the batteries. The resistor 190 may be a one percent carbon film resistor having a resistance value of substantially 38.3 ohms and the standardizing rheostat 197 may be a ten-turn rheostat having a resistance value of about 100 ohms. As will be pointed out more fully hereafter, when the low current batteries or cells 198 and 199 are utilized in parallel with the high current batteries or cells 188 and 189, the switch 191 is opened so that the resistor 190 is arranged in series with the batteries 188 and 189, this switch 191 being automatically opened when the batteries 198 and 199 are incorporated into the potentiometer circuit. When both kinds of batteries or cells 188, 189 and 198, 199 are used, the E.M.F. applied to the potentiometer circuit by the batteries or cells 188 and 189 must be slightly lower than that applied by the batteries or cells 198 and 199. The resistor 190 drops the E.M.F. at batteries or cells 188 and 190 to about 2.6 volts, the E.M.F. of the batteries or cells 198 and 199 being about 2.7 volts. With this arrangement, the high current batteries or cells 188 and 189 supply most of the current and the low current batteries or cells 198 and 199 maintain a constant total current by supplying an additional amount of current necessary to develop 2.5 volts across the potentiometer circuit. By reason of this arrangement, therefore, a substantially constant current at a substantially constant voltage is applied to the potentiometer circuit over long periods of time, which eliminates the necessity for frequent standardizing of the potentiometer circuit. If desired, the batteries or cells 198 and 199 may be removed from the instrument and when this is done, the shorting switch 191 is automatically closed to shunt the resistor 190 so that the full voltage and current of the high current batteries 188 and 199 is applied through the standardizing rheostat 197 to the potentiometer circuit.

The potentiometer circuit also includes a standardization circuit including a resistor 206 of 1475 ohms, a calibration potentiometer 207 of 25 ohms having a contactor 208, and a standardizing resistor 209 having a resistance of 1,000 ohms. These elements 206, 207 and 209 are connected in series across the potentiometer circuit, the resistor 209 operating as the comparison resistor for standardizing purposes and the potentiometer 207, 208 operating as a calibration control.

The potentiometer circuit also includes a pushbutton type of switch mechanism including a switch arm 211 normally engaging a contact 212, but movable into engagement with a contact 213, and a switch arm 214 normally engaging a contact 215, but movable into engagement with a contact 216. These switch arms 211 and 214 are suitably mechanically connected together and operated by a pushbutton 219. The contact 216 is connected to the plus side of a standard cell 217, which may be of the Epley type producing about 1.019 volts. The minus side of this standard cell is connected through a resistor 218 having a resistance value of 100K to the comparison resistor 209. The contact 213 is connected to the contactor 208 of the calibration potentiometer and the contact 212 is connected to one end of the slide wire 128.

The 2.5 volts developed across the potentiometer circuit is nominal, its exact value depending upon the percentage of the slide wire required for the pen carriage to traverse the chart. If in a particular instrument 99 percent of the slide wire is used, then the E.M.F. across the circuit should be $$E=\frac{1}{.99}\times 2.5=1.01\times 2.5$$

which is nearly one percent over nominal. This will vary from instrument to instrument, depending upon the circumference of the cable drum 140. Calibration is accomplished by applying a known voltage at the recorder input which will give full scale pen travel in one of the range positions. By adjusting the calibration potentiometer 207, 208 and standardizing, in a manner to be pointed out hereafter, the scale can be calibrated to read exactly the applied voltage. This, of course, is done on a millivolt range and need not be repeated on the other ranges.

The potentiometer apparatus is also provided with a displacement control mechanism generally designated at 221. It includes three switch arms 222, 223 and 224, which are simultaneously operated by a knob 225 with respect to seven contacts for each switch arm, which are designated Off, and H, M, L on both sides of Off, which designations represent Off, and High, Medium, Low, in opposite directions, respectively. The left hand contacts H, M and L associated with the switch arms 222 and 223 as well as the Off contact associated with the switch arm 222 are connected to the collector winding 129 of the slide wire. The right hand contacts H, M and L associated with the switch arms 222 and 223 and the Off contact associated with the switch arm 224 are connected to the input voltage. The L and M contacts associated with the switch arm 224 are connected in parallel to resistances 226 and 227, respectively, the resistance 226 having a resistance value of 100K and the resistance 227 having a resistance value of 10K. These resistances 226 and 227 and the H contacts associated with the switch arm 224 are connected to the minus side of a battery or cell 228, such as a Mallory RM42R mercury cell. The plus side of the battery or cell 228 is connected to one end of a potentiometer 229, the other end of which is connected to the switch arms 222 and 224. The potentiometer 229 is a ten turn potentiometer and may have a resistance value of 1,000 ohms. The slider 230 of the potentiometer is connected to the switch arm 223.

In the "Off" position, the switch arms 222, 223 and 224 open the circuits through the battery or cell 228 and completely remove the displacement circuit from the potentiometer circuit so that it has no effect thereon. When the switch arms 222, 223 and 224 are moved to the "medium" position as illustrated in FIG. 20, the potentiometer 29 is connected in series with the resistance 227 and is also connected in the potentiometer circuit to provide a medium amount of downscale displacement of the pen carriage, which amount may be adjusted by manipulating the slider 230. Other amounts of displacement may be obtained by adjusting the switch arms 222, 223 and 224 to the L and H contacts on the same side of the Off contacts.

To measure the exact amount of displacement provided at any time all that is necessary is to position the switch arms 222, 223 and 224 to the corresponding contacts on the other side of the Off contacts and to short the input terminals 234 and 235 to the potentiometer circuit. When this is done, the displacement control mechanism is reversed and the the pen carriage will record on the chart the exact amount of such displacement. Thus, High, Medium, or Low displacements may be provided and the amount of each such displacement may be regulated by movement of the slider 230, the amount of displacement may be measured and recorded, and the displacement control may be removed entirely from the potentiometer circuit.

Voltages or currents which are to be measured and recorded by the instrument are applied to input terminals 231 and 232 of an input socket 233, which is suitably grounded. These voltages or currents may also be applied to input terminal posts 234 and 235, which are, in turn, connected to the terminals 231 and 232, respectively. Associated with the input terminals 234 and 235 is also a ground terminal 434 which may be connected to either terminal 234 or 235 by a suitable slip 435 for grounding purposes. Associated with the input terminals is a units switch mechanism which is selectively operated for measuring voltages having values of volts or millivolts, and currents having values of milliamps and microamps. This units switching mechanism includes a pair of switch arms 237 and 238 which are simultaneously operated by a knob 239 with respect to contacts marked V, *m*V, *m*A and $\mu$A. The negative input terminals 232 and 235 are connected to the contacts *m*V, *m*A and $\mu$A associated with the switch arm 237 and also through a resistor 240, having a resistance value of 1M to the switch arms 237 and 238. The positive input terminals 231 and 234 are connected through a resistor 242 to the contacts $\mu$A and V associated with the switch arm 238 and through a resistor 241 with the contact $\mu$A associated with the switch arm 238. The resistor 242 has a resistance value of 1,000 ohms and the resistor 241 has a resistance value of 1 ohm. The positive input terminals 231 and 234 are also connected to the contact 215 of the pushbutton switch arm 214, and the switch arms 237 and 238 are connected to the switch arm 222 of the displacement control mechanism. A condenser 244 is connected between the positive input terminals 231 and 234, and the switch arms 237 and 238, and the switch arms 237 and 238 are also connected to ground by a condenser 245. These condensers 244 and 245 operate as filter condensers for filtering out stray alternating currents which may be picked up by the leads connected to the input terminals.

The potentiometer apparatus also includes a converter or chopper generally designated at 247. It includes an operating coil 248 energized with 60 cycle alternating current for synchronously operating a switch arm 249 with respect to a pair of contacts 250 and 251. The switch arm 249 under the operation of the coil 248 alternately engages the contacts 250 and 251 at a rate of 60 cycles per second, and the contacts 250 and 251 are so arranged that the contacts break before make. This converter or chopper may be a Stevens-Arnold type E–12 chopper, and provision is made for grounding the same. The converter or chopper 247 is associated with an input transformer generally designated at 253, having a center tapped primary 252 and a secondary 254. This input transformer is also grounded and it is a highly shielded step-up transformer with a standard folded type construction. The ends of the primary 252 of the transformer are connected to the contacts 250 and 251, respectively, of the chopper 247. The switch arm 249 of the chopper is connected through a fuse 255 to the switch arm 211 of the pushbutton switch, and the center tap of the primary 252 of the transformer is connected to the switch arm 214 of the pushbutton switch. The converter or chopper 247 and the input transformer 253 operate to convert D.C. voltages applied thereto of one polarity or of opposite polarity into a 60 cycle alternating voltage of one phase or of opposite phase, depending upon the polarity of the applied D.C. voltage. The amplitude of the alternating voltage so produced varies as the value of the applied D.C. voltage varies. When the applied D.C. voltage is zero, then no alternating voltage is produced. The alternating voltage produced in the secondary 254 of the input transformer 253 is amplified by the amplifier for controlling the operation of the reversible electric motor 126, which, in turn, operates the slide wire assembly and the recording mechanism.

With the parts in the positions illustrated in FIG. 20, a voltage in the range of millivolts is being applied to the input terminals 231 and 232 and, accordingly, the units switching mechanism is positioned for the purpose of recording millivolts. The displacement control mechanism may be in the "off" position so that it has no effect. The range selecting mechanism is positioned for a full scale range of 5 millivolts so that the recording mechanism will record applied millivolts on the chart within a chart range of 5 millivolts. If now the input voltage should increase, the potentiometer circuit is unbalanced in one direction to apply a D.C. voltage to the chopper 247 and the input transformer 253 for the purpose of producing an alternating voltage of one phase for operating the reversible electric motor 126 to adjust the slide wire 128 in one direction. When the slide wire 128 is adjusted to rebalance the potentiometer circuit, the D.C. voltage applied to the chopper 247 and the input transformer 253 is reduced to zero and operation of the reversible electric motor 126 is stopped. Thus, the pen carriage is moved to a new position up scale for recording the increased voltage applied to the input terminals 231 and 232. When the input voltage decreases, the potentiometer circuit is unbalanced in the opposite direction to produce a D.C. voltage of opposite polarity, which is applied to the chopper 247 and the input transformer 253. As a result an alternating current of opposite phase is produced, which operates to drive the reversible electric motor and hence adjust the slide wire 128 in the opposite direction. When the potentiometer circuit is again rebalanced by this adjustment, the D.C. voltage of opposite polarity applied to the chopper 247 and input transformer 253 is reduced to zero and the operation of the reversible electric motor 126 is stopped. The recording mechanism operated by the reversible electric motor then records on the chart the decrease in the applied voltage.

If it is desired to measure millivolts of different ranges, the range control mechanism may be adjusted to the desired range position. If it is desired to displace the record on the chart, the displacement control mechanism may be adjusted to the desired position, for example, by moving the switch arms 222, 223 and 224 into engagement with the M contacts, as shown. In so doing, a medium D.C. voltage is produced across the potentiometer 229 so as to get a medium amount of suppression, the exact amount of suppression being determined by shifting the slider 230 with respect to the potentiometer 229. Low and high amounts of displacement or suppression may also be obtained in the same manner by moving the switch arms 222, 223, and 224 into engagement with the L contacts or H contacts, respectively.

If it be desired to measure volts instead of millivolts, the switch arms 237 and 238 of the units switching mechanism are moved into engagement with the V contacts, and when this is done the resistor 242 is connected in shunt with the applied input voltage and the resistor 240 in series therewith, the resistors 242 and 240 acting as a voltage divider so that volts may be measured and recorded as distinguished from millivolts. If it be desired to measure and record milliamps, the switch arms 237 and 238 are moved into engagement with the *m*A contacts. When this is done, the input current is passed through the resistor 241 and the potentiometer circuit measures the voltage drop across the resistor 241 to measure and record the applied milliamp current. Likewise, if it be desired to record current in the range of microamps, the switch arms 237 and 238 are moved into engagement with the contacts $\mu$A. When this is done, the applied input current is passed through the resistor 242 and the potentiometer circuit measures the voltage drop across the resistor 242 to measure and record the microamp current. Regardless of what position the units switching mechanism is switched to, the range adjusting mechanism 176 may be adjusted to desired positions for recording the applied input voltages or currents for desired full scale ranges.

When it is desired to standardize the potentiometer apparatus, the pushbutton 219 is depressed to cause the switch arms 211 and 214 to engage the contacts 213 and 216, respectively. The chopper 247 and input transformer 253 are then connected in series with the standard cell 217 and the comparison resistor 209. If the voltage applied to the potentiometer circuit by the batteries or cells 188, 189, 198 and 199, is at the correct value, zero voltage is applied to the chopper 247 and input transformer 253, and there will be no operation of the reversible electric motor. If, however, the voltages produced thereby are above or below a standard value, a voltage of one polarity or of opposite polarity is applied to the chopper 247 and the input transformer 253, whereupon the reversible electric motor 126 may be operated in a direction depending upon the polarity of the voltage so applied. The standardizing rheostat 197 is, thereupon, adjusted until the voltage becomes zero and operation of the reversible electric motor 126 is stopped, and when this occurs the potentiometer circuit is properly standardized. The pushbutton 219 is then released and the switch arms 211 and 214 then again engage the contacts 212 and 215 for normal operation of the instrument.

Referring now to FIG. 21, 60 cycle alternating current is supplied to the recording instrument from line wires through a conventional plug 260, one line wire being connected to switch arm 265, and the other line wire being connected to switch arm 266 of a double pole three-position reversing switch having contacts 261 and 263 connected together, contacts 262 and 264 connected together, and intermediate "off" contacts 267. When the switch arms 265 and 266 are moved to the intermediate "off" position where they engage the dead contacts 267, the supply of current to the instrument is interrupted. When the switch arms 265 and 266 are engaged with the contacts 261 and 264, these contacts are connected to the line wires, respectively, and when the switch arms 265 and 266 are moved into engagement with the contacts 263 and 262, those contacts are connected to opposite line wires. The switch arms 265 and 266 are mechanically connected together and are operated by the same knob 204 which operates the switch arms 196 and 203 in FIG. 20. Thus, when the knob 204 is operated to interrupt the current supply to the instrument from the line wires, the battery circuits for the potentiometer circuit are also interrupted to prevent drain of the batteries or cells when the instrument is turned off and not in use. The contacts 261 and 263 are connected through a fuse 268 to one end of a primary 269 of a transformer 270, the other end of the primary 269 being connected to the contacts 262 and 264. The transformer 270 is a power transformer having three secondaries, a center tapped secondary 271 associated with a rectifier for supplying B+ voltage to the amplifier, a center tapped secondary 272 for operating the reversible electric motor 126, and a center tapped secondary 273 for supplying alternating current to the filaments of the vacuum tubes of the amplifier and to the operating coil 248 of the converter or chopper 247.

The amplifier is generally designated at 274 in FIG. 21 and it includes a rectifier tube 275 which may be a 6 x 4 tube having plates 276 connected to the ends of the transformer secondary 271, the center tap of the secondary 271 being connected to ground. The rectifier tube 275 also includes a common cathode 278, which is heated by a filament 279. The cathode 278 is connected to ground through a condenser 280 and through resistances 281, 283 and 285 with associated condensers 282, 284 and 286 connected to ground for applying B+ voltage to the various stages of amplification of the amplifier 274.

The resistance 285 and condenser 286 are connected through a load resistance 288 to the plate 289 of tube 290, having a control grid 291, a cathode 292 and a filament 293. The cathode 292 is connected to ground through a resistor 294 and a condenser 295 to provide grid bias. This tube section 290 forms the first stage of amplification of the amplifier 274 and the control grid 291 is connected to the secondary 254 of the input transformer 253 and to ground through a condenser 296. Thus, the alternating voltage signal of one phase or of opposite phase induced in the input transformer secondary 254 is applied to the control grid 291 for amplification purposes.

The plate 289 of the tube section 290 is connected through a condenser 298 to the control grid 300 of a tube section 301 having a plate 302, a cathode 304 and a filament 305, the plate 302 being connected through a load resistor 303 to the resistor 283 and condenser 284. The control grid 300 is also connected to ground through a resistor 299. The two tube sections 290 and 301 may be the respective sections of a 12AX7 vacuum tube. The cathode 304 is normally connected to ground through a resistor 306 and parallel condenser 306', a switch arm 310, contact 308 and a variable resistance 307. The switch arm 310 is operated by the pushbutton 219. When the pushbutton 219 is released during normal operation of the instrument, the switch arm 310 engages the contact 308 so that the sole connection of the cathode 304 to ground is through the resistor 306, parallel condenser 306', and the variable resistance 307. The cathode is modulated at 60 cycles through a resistor 357 connected to the switch arm 310 for anti-hunting purposes, as will be pointed out in more detail hereafter. The voltage value of the cathode 304 may be adjusted by the variable resistance 307 for regulating the amount of anti-hunting action transmitted to the cathode through the resistor 357. When the pushbutton 219 is depressed during standardizing, the switch arm 310 engages the contact 309 to ground the cathode through a resistance 311 for reducing the anti-hunting signal from the cathode 304. The tube section 301, therefore, provides the second stage of amplification of the amplifier 274 and is also utilized for introducing a degenerative feedback from the reversible electric motor 126 for anti-hunting purposes.

The plate 302 of the tube section 301 is connected through a condenser 312 to a condenser 313 of a filter 314. The filter 314 includes series connected chokes 315 and 316, the choke 315 being connected to the condenser 313 and the choke 316 having a condenser 317 connected thereacross. One end of the choke 316 is connected to ground and the other end is conductively coupled to the control grid 319 of a tube section 320. The filter 314 passes a narrow band centered at a frequency of 60 cycles and it operates excellently to reject 120 cycle signals which originate as 60 cycle pickup strays induced into the potentiometer network ahead of the chopper or converter 247. In other words, any 60 cycle stray currents which are picked up ahead of the chopper 247 are converted into 120 cycle signals, and these 120 cycle signals are rejected by the filter 314. This filter 314 may be like the type BMI–60 filter manufactured by United Transformer Company.

The tube section 320, in addition to including the control grid 319, also includes a plate 321 connected through a load resistance 322 to the resistor 281 and condenser 282. It also includes a cathode 323 and a filament 324, the cathode 323 being conected through a resistor 325 and a condenser 326 to ground to provide grid bias. The plate 321 of the tube section 320 is connected through a condenser 327 and a resistance 328 to ground, and through the condenser 327 to the control grid 329 of a tube section 330. The tube sections 320 and 330 may be the sections of a 12AX7 vacuum tube. The tube section 330 includes a plate 331 connected through a resistance 332 to the cathode 278 of the rectifier tube 275 and to the condenser 280. It also includes a cathode 333 and a filament 334, the cathode 333 being connected through a resistance 335 and a condenser 336 to ground. The tube sections 320 and 330 form the third and fourth stages of amplification of the amplifier 274.

The plate 331 of the last stage of amplification is connected through a condenser 338 and a resistance 337 to ground, and through the condenser 338 to the control grids 339 and 340 of a pair of tubes 341 and 342, the control grids all swinging together. The tubes 341 and 342 may be 12AU7 tubes. The tube 341 includes a pair of plates 343 and 344, a pair of cathodes 345 and 346, and a pair of filaments 347. Likewise, the tube 342 includes a pair of plates 348 and 349, a pair of cathodes 350 and 351, and a pair of filaments 352. The two tubes 341 and 342 are connected in parallel, plates 343 and 348 being connected together, the plates 344 and 349 being connected together, and all of the cathodes 345, 346, 350 and 351 being connected together and to ground through a resistor 353.

The plates 343 and 348 are connected to one end of the transformer secondary 272, and the plates 344 and 349 are connected to the other end thereof. The center tap of the transformer secondary 272 is connected to one end of the control winding of the reversible electric motor 126, the other end thereof being connected to ground. A condenser 355 is connected in parallel with the control winding of the motor 126 to form a resonant circuit at 60 cycles. The power winding of the reversible electric motor 126 is connected to the ends of the primary 269 of the transformer and has a condenser 354 connected in series therewith to cause the current through the power winding to lead the current of the transformer by 90 degrees. The amplifier produces a 60 cycle output signal which is either in phase with the 60 cycle line voltage or 180 degrees out of phase therewith, depending upon the direction of unbalance of the potentiometer circuit, and this 60 cycle output signal is applied to the control grids 339 and 340 of the two power tubes 341 and 342, so that the control grids of the two tubes swing together. For purposes of illustration, it is assumed that during the first half cycle of the line voltage the plates 343 and 348 go positive and the plates 344 and 349 go negative, and that during the second half cycle of the reference voltage, the plates 344 and 349 go positive and the plates 343 and 348 go negative.

If the signal produced at the output of the amplifier is in phase with the reference voltage, the grids 339 and 340 go positive during the first half cycle and negative during the second half cycle. Under these in-phase signal conditions, only the plates 343 and 348 conduct during the first half cycle and none of them conduct during the second half cycle. As a result, an alternating current, which is in phase with the reference voltage, is caused to pass through the control winding of the reversible electric motor. This current, therefore, lags the current through the power winding of the reversible electric motor 126 to cause the reversible electric motor to operate in one direction. If now the output signal from the amplifier is 180 degrees out of phase with the reference voltage, which is brought about by an unbalance of the potentiometer circuit in the opposite direction, the control grids 339 and 340 become positive during the second half cycle and negative during the first half cycle. As a result, only the plates 344 and 349 conduct during the second half cycle and none of these conduct during the first half cycle. This causes a current to pass through the control winding of the reversible electric motor 126, which is 180 degrees out of phase with the reference voltage. Since this current, through the control winding, therefore, leads the current through the power winding of the reversible electric motor 126 by 90 degrees, the reversible electric motor 126 is rotated in the opposite direction. Accordingly, the reversible motor 126 is rotated in one direction or the opposite direction, dependent upon the direction of unbalance of the potentiometer circuit and operates the slide wire 128 in the proper direction to rebalance the potentiometer circuit.

When the potentiometer circuit is balanced, the signal on the control grids 339 and 340 is zero and due to the connections between the reversible electric motor 126, the center tapped transformer 272 and the plates of the tubes 341 and 342, these tubes cause a 120 cycle current to pass through the control winding of the reversible electric motor 126, this 120 cycle current having a D.C. component which operates to produce a braking effect against coasting of the motor. The center tap of the transformer secondary 272 is connected through the resistance 357 to the cathode 304 of the second stage of amplification through resistance 306 and condenser 306′ and to ground through the variable resistance 307, as explained above. When the reversible electric motor 126 is rotating in one direction or the other, it develops a 60 cycle back E.M.F. which is 180 degrees out of phase with the current supplied thereto for that direction of rotation, and this out of phase voltage is applied to the cathode of the second stage of amplification for modulating the same in opposition to the signal applied to the control grid thereof to act as a degenerative feedback for anti-hunting purposes, the amount of the degenerative feedback being regulated by adjustment of the variable resistance 307. Any 120 cycle back E.M.F. which might be developed, due to coasting of the motor is filtered out by the filter 314 so that it will not operate to work the amplifier and diminish the anti-hunting action.

The electro-magnetic clutch 57 and the reversible electric motors 96 and 106 are controlled by a multiple switching mechanism generally designated at 360 in FIG. 21. This multiple switching mechanism includes switch arms 361, 362, 363 and 364, which are operated by a knob 365 with respect to contacts N, R, B, F and N associated with each switch arm. The contacts N, R, B, and F designate, respectively, neutral, reverse, brake and forward. One side of the power source extends from contacts 261 and 263 through fuse 268 to one side of the electro-magnetic clutch 57, the reversible motor 96 and the reversible motor 106. The electro-magnetic clutch 57 includes a D.C. electro-magnet and has a condenser 367 connected in parallel thereto. The other side of the electro-magnet 57 is connected to both terminals N associated with the switch arm 361, and the switch arm 361 is connected through a rectifier 368 and a resistor 369, to the contacts 262 and 264 and hence to the other side of the power source. A condenser 370 is also connected in parallel with the electro-magnet 57 and to the rectifier 368. When the switch arm 361 of the multiple switch 360 is moved into engagement with either of the contacts N, D.C. current is passed through the electro-magnet 57 for energizing the same. When, however, the switch arm 361 is moved out of engagement with the contacts N, the circuit through the electro-magnet 57 is broken so that the clutch is engaged. Thus, the only time that the electro-magnetic clutch is disengaged is when the switch arm 361 engages either contact N. The rectifier 368 may be a 150 milliamp selenium rectifier such as a Sarkes, Tarzian type 150.

The reversible electric motor 96 for driving the chart feed roll has a phasing condenser 371 connected thereto, one side of the condenser 371 being connected to the contact R and the other side thereof being connected to the contact F associated with the switch arm 362 of the multiple switch mechanism 360. The switch arm 362 is connected to the other side of the power source. When the switch arm 362 is moved into engagement with the contact F, the reversible electric motor 96 is operated in a forward direction to operate the feed roll to drive the chart from the chart supply roll to the chart take-up roll. When the switch arm 362 is moved into engagement with the contact R, the reversible electric motor 96 is operated in the opposite direction to feed the chart from the chart take-up roll to the chart supply roll. When the switch arm 362 is moved into engagement with any of the contacts N or D, the driving circuits for the reversible electric motor 96 are interrupted. One side of the condenser 371 associated with the reversible electric motor 96 is connected to the contact B associated with the switch arm 361. When the switching mechanism is moved to the brake position where the switch arms 361 and 362 engage the contacts B, the reversible electric motor 96 is connected in series with the rectifier 368 for the purpose of passing a D.C. current through the motor. This D.C. current passing through the motor 96 acts as a brake for the motor to lock the same in position and prevent rotation of the chart feed roll.

A phasing condenser 373 is connected to the reversible electric motor 106, one side of the condenser being connected to the contact R and the other side thereof being connected to the contact F associated with the switch arm 363. The switch arm 363 is, in turn, connected to the other side of the power source. When the switch arm 363 is moved into engagement with the contact F, the reversible electric motor 106 is rotated in a forward direction to cause the friction drive wheel to engage the chart on the chart take-up roll to drive the chart in a forward direction. When the switch arm 363 engages contact R, the reversible electric motor 106 is rotated in the opposite direction to cause the friction drive wheel to engage the chart on the chart supply roll to move the chart in a rearward direction. The opposite sides of the phasing condenser 373 are also connected to contacts 375 and 376, respectively, which are adapted to be alternately engaged by a three-position switch arm 374. The switch arm 374 in turn is connected to the contacts N associated with the switch arm 363. When the switch arm 363 engages either of the contacts N, the switch arm 374 and contacts 375 and 376 are activated for the purpose of operating the reversible electric motor 106 in one direction or the other. Under these conditions, when the switch arm 374 is in its mid position, the circuit through the reversible electric motor is broken, and when the switch arm 374 is moved into engagement with the contact 376, the reversible electric motor 106 is operated in a forward direction, and when the switch arm 374 is moved into engagement with the contact 375, the reversible electric motor 106 is operated in the reverse direction.

Thus it is seen that when the multiple switch mechanism 360 is in the brake position, the electro magnetic clutch is engaged, the friction drive wheel motor 106 is de-energized, and a D.C. brake current is passed through the chart feed roll motor 96 to brake the same, so as to lock the chart in position. When the switch mechanism is shifted to the forward position, the electro magnetic clutch 57 is engaged, the chart feed roll motor 96 is operated to drive the chart feed roll in a forward direction to feed the chart from the chart supply roll to the chart take-up roll, and the friction drive wheel motor 106 is operated to move the friction drive wheel against the chart take-up roll and rotate the same forwardly to tension the chart. When the switch mechanism is shifted to the reverse position, the electro magnetic clutch 57 is engaged, the chart feed roll motor 96 is operated in the opposite direction to feed the chart rearwardly from the chart take-up roll to the chart supply roll, and the friction drive wheel motor 106 is operated in the opposite direction to move the friction drive wheel against the chart supply roll and rotate the same to tension the chart in its rearward movement. When the switch mechanism is shifted to either neutral position, the electro magnetic clutch 57 is released and the chart drive roll motor 96 is de-energized to allow free wheeling of the chart feed roll. In either of the neutral positions, the friction drive wheel motor 106 is under the control of the three-position switch 374, which, when shifted to its middle position, de-energizes the friction drive wheel motor 106 to allow ready manual manipulation of the chart. When the switch arm 374 is moved into engagement with the contact 376 or the contact 375, the friction drive wheel motor 106 is operated in one direction or the other to move the chart rapidly in one or the other of the selected forward or rearward directions. This versatile operation of the chart, as accomplished by the multiple switch mechanism 360, is extremely beneficial for analytical and testing work encountered in laboratories or the like.

The switch arm 364 of the multiple switch mechanism 360 may be utilized for controlling a remote control circuit for operating other equipment simultaneously with the operation of the chart forwardly and rearwardly as the chart is driven by the chart feed roll motor 96. In this connection, the contacts F and R are connected together and to a terminal 378 of a socket 380, and the switch arm 364 is connected to a terminal 379 of that socket. Thus, as the chart is driven in one direction or the other by the chart feed roll motor 96, a circuit is completed through the socket 380 for remote control purposes. An indicating or pilot lamp 382 may be connected to one side of the fuse 268 and to ground for indicating the application of power to the measuring and recording instrument.

The front panel 15 of the base 11, which is secured on the base 11 by screws 385 or the like, carries the socket 233 and terminal posts 234, 235 and 434, forming the input to the instrument for measuring and recording the conditions to be measured. This panel 15 also carries the knob 186 for providing range adjustments, the knob 239 for providing units adjustments, the knob 307 for regulating the amount of degenerative feedback for anti-hunting purposes, the pushbutton 219 and the rheostat knob 197 for standardizing purposes, the knob 225 for displacement selection, the knob 230 for displacement adjustment, the knob 204 for turning on and off the power to the instrument, the indicator lamp 382 for indicating power on the instrument, the knob 365 of the chart drive switch mechanism, the switch 374 for operating the chart at rapid speeds, and the remote control socket 380. By grouping all of these controls on the front panel 15, ready manipulation and operation of the measuring and recording instrument are provided.

The rear panel 16, which is removably held in place on the rear of the base 11, in addition to carrying the chassis 18 of the amplifier 274, also carries the fuse 268 by means of a conventional fuse post, the high current batteries or cells 188 and 189, and the low current constant voltage batteries or cells 198, 199, and 228. The high current batteries or cells 188 and 189 may be secured in place by a strap 388 carried by the rear panel 16.

The top of the chassis 18, as shown more clearly in FIGS. 16 to 19, carries a pair of insulating plates 390 and 391, these insulating plates in turn carrying three contact fingers 392 and three opposed contact fingers 393. These contact fingers 392 and 393 are adapted to engage the end terminals of the low current constant voltage batteries or cells 198, 199, and 228. These cells 198, 199, and 228 are held in place by a clamp member 394 extending thereover, studs 395 carried by the chassis and retaining nuts 396 carried by the studs. Thus, the cells 198, 199 and 228 may be readily inserted and removed, and when inserted they are connected into the potentiometer apparatus by the spring contact fingers 392 and 393, the electrical connections being illustrated diagrammatically in FIG. 20. The shunting switch 191 for the dropping resistor 190 is located below the low current and constant voltage cell 199, and it is provided with an upwardly extending plunger 398. When the cell 199 is inserted into the potentiometer apparatus, the plunger 398 is depressed to open the switch 191 and when it is removed, the plunger 398 moves upwardly to close the switch. Thus, the switch 191 is automatically opened and closed by the insertion of the cell 199 into the circuit and the removal thereof from the circuit for the purposes expressed above.

As shown in FIG. 2, the chart 43 has 5 main chart areas numbered between 0, 50, 100, 150, 200, and 250, each main chart area having 5 sub-areas, and each sub-area having 10 basic areas. This chart with these designations and areas is a linear chart and may be utilized with any one of the full scale ranges of 1.25, 2.5, 5.0, 12.5, 25, 50, 125, 250, 500, 1250 and 2500 as determined by adjustment of the knob 186 of the range adjustment switch mechanism 176. The chart has a measuring width of 250 millimeters and a length of 120 feet. Lengthwise, the chart is divided into time areas of 1 inch and each time area is divided into 10 sub-areas. These time areas function admirably with the various chart speeds of ⅓, ½, 1, 1½, 2, 2⅔, 4, 8 and 12 inches per minute to provide easy time reading. By reason of these arrangements an extremely flexible and versatile measuring and recording instrument is provided.

The recording instrument may also be provided with an additional slide wire 440, as shown in FIG. 32, which may be utilized for remote indicating or recording purposes. Here, the additional slide wire 440 is secured to a bracket 441 which, in turn, is secured to the bracket 125 carried by the side plate 21. The rotatable shaft 442 of the additional slide wire 440 is provided with a gear 443 meshing with the gear 135 of the drum 140 driven by the reversible electric motor 126. Thus, as the reversible electric motor 126 is rotated to balance the potentiometer circuit and record upon the chart, the additional slide wire 440 is correspondingly operated for remote indication or recording purposes.

In order to provide additional flexibility in the chart drive mechanism for obtaining desired chart speeds, an adjustable speed reducer mechanism may be interposed between the electric motor 96 and the chart feed roll 38. This adjustable speed reducer is generally designated at 445 in FIGS. 35 to 39. It includes a pair of spaced plates 446 and 447 secured together by spacers 448. The plate 446 is suitably secured to the bracket 85 by screws 449. The electric motor 96 is suitably secured to the plate 447, and the shaft 97 of the electric motor 96 is provided with three gears 450, 451 and 452, interposed between the plates 446 and 447. An intermediate shaft 453, which is rotatably mounted in the plates 446 and 447, and also mounted for sliding movement, carries three gears 454, 455 and 456. An output shaft 457 is mounted for rotation by the plates 446 and 447 and it is provided with three gears 458, 459 and 460. The output shaft 457 carries the hub 98 upon which the interchangeable gears 99 are removably secured.

The intermediate shaft 453 is provided with a knob 461 for sliding the intermediate shaft to any one of three positions, which are determined by grooves 462, 463, and 464, formed in the intermediate shaft 453. A spring detent member 465 is secured to the plate 447 by a screw 466 and this spring detent member 465, as shown in FIGS. 36 and 37, cooperates with the grooves 462, 463, and 464 for longitudinally positioning the intermediate shaft 453 at desired positions.

When the shaft 453 is in the position illustrated in FIG. 26, where the spring detent member 465 engages the groove 462, gear 454 meshes with gear 450 and gear 455 meshes with gear 458. The ratios of these gears is such that a 1 to 5 ratio is provided, so that when the shaft 97 is rotated at 1 r.p.m. the shaft 457 is rotated at 5 r.p.m. When the shaft 453 is longitudinally positioned to an intermediate position, as determined by the groove 463 and the spring detent member 465, and as shown in FIG. 38, the gear 455 meshes with the gear 451 and with the gear 459 so as to provide a 1 to 1 ratio. Accordingly, as the shaft 97 is rotated at 1 r.p.m. the shaft 457 is also rotated at 1 r.p.m. When the shaft 453 is longitudinally positioned to a position where the groove 464 cooperates with the spring detent member 465, as shown in FIG. 39, the gear 455 meshes with the gear 452 and the gear 456 meshes with the gear 460 so as to provide a 5 to 1 speed reduction. Thus, as the shaft 97 is rotated at 1 r.p.m., the shaft 457 is rotated at ⅕ r.p.m.

Thus, in addition to providing the various chart speeds, by reason of the interchangeable gears 93 and 99, as explained above, any of these chart speeds of ⅓, ½, 1, 1½, 2, 2⅔, 4, 8 and 12 inches per minute may be increased or decreased by 5 times, merely by the appropriate manipulation of the adjustable speed reducer mechanism 445.

While for purposes of illustration, one basic form of this invention has been disclosed, other forms thereof may become apparent to those skilled in the art upon reference to this disclosure and, therefore, this invention is to be limited only by the scope of the appended claims.

We claim as our invention:

1. In a measuring and recording instrument having recording means adjacent a chart feed roll and movable across a chart for making a record on the chart, the improvement comprising, a frame including a pair of side plates, a chart feed roll rotatably mounted between the side plates adjacent the top of the frame, a chart supply roll rotatably mounted between the side plates adjacent the bottom rear of the frame, a chart take up roll rotatably mounted between the side plates adjacent the bottom front of the frame, a platen extending between the side plates adjacent the front of the frame, a chart extending from the chart supply roll over the chart feed roll and the platen to the chart take up roll, a first reversible electric motor carried by the frame, means connecting the first reversible electric motor to the chart feed roll, means for operating the first reversible electric motor in one direction for moving the chart in one direction toward the chart take up roll and in the opposite direction for moving the chart in the opposite direction toward the chart supply roll, means including a friction drive wheel movably supported by the frame between the chart take up roll and the chart supply roll and adapted selectively to engage the chart on one or the other of said rolls, a second reversible electric motor carried by the frame, means connecting the second reversible electric motor to the friction drive wheel, and means for operating the second reversible electric motor in one direction and engaging the friction drive wheel with the chart on the chart take up roll when the first electric motor is operated in said one direction also to move the chart in said one direction, and for operating the second reversible electric motor in the opposite direction and engaging the friction drive wheel with the chart on the chart supply roll when the first electric motor is operated in said opposite direction also to move the chart in said opposite direction, said second reversible electric motor being operable to move the chart at a greater speed than said first reversible electric motor, and said connecting means between the chart feed roll and the first reversible electric motor including means for disconnecting the chart feed roll from the first reversible electric motor to allow independent movement of the chart at said greater speed by the second reversible electric motor.

2. In a measuring and recording instrument having recording means adjacent a chart feed roll and movable across a chart for making a record on the chart, the improvement comprising, a frame including a pair of side plates, a chart feed roll rotatably mounted between the side plates adjacent the top of the frame, a chart supply roll rotatably mounted between the side plates adjacent the bottom rear of the frame, a chart take up roll rotatably mounted between the side plates adjacent the bottom front of the frame, a platen extending between the side plates adjacent the front of the frame, a chart extending from the chart supply roll over the chart feed roll and the platen to the chart take up roll, a first reversible electric motor carried by the frame, means connecting the first reversible electric motor to the chart feed roll, means for operating the first reversible electric motor in one direction for moving the chart in one direction toward the chart take up roll and in the opposite direction for moving the chart in the opposite direction toward the chart supply roll, means including a friction drive wheel movably supported by the frame between the chart take up roll and the chart supply roll and adapted selectively to engage the chart on one or the other of said rolls, a second reversible electric motor carried by the frame, means connecting the second reversible electric motor to the friction drive wheel, and means for operating the second reversible electric motor in one direction and engaging the friction drive wheel with the chart on the chart take up roll when the first electric motor is operated in said one direction also to move the chart in said one direction, and for operating the second reversible electric motor in the opposite direction and engaging the friction drive wheel with the chart on the chart supply roll when the first electric motor is operated in said opposite direction also to move the chart in said opposite direction, said second reversible electric motor tending, through the friction drive wheel, to move the chart in said one or opposite directions at a greater speed than the chart is moved in said one or opposite directions by the chart feed roll and the first reversible electric motor, and slip friction means in the connecting means between the second reversible electric motor and the friction drive wheel to cause the chart to be moved at a lesser speed determined by the chart feed roll and the first reversible electric motor and to cause the chart to be tensioned by the friction drive wheel, said connecting means between the chart feed roll and the first reversible electric motor including means for disconnecting the chart feed roll from the first reversible electric motor to allow independent movement of the chart at said greater speed by the second reversible electric motor.

3. In a measuring and recording instrument having recording means adjacent a chart feed roll and movable across a chart for making a record on the chart, the improvement comprising, a frame including a pair of side plates, a chart feed roll rotatably mounted between the side plates adjacent the top of the frame, a chart supply roll rotatably mounted between the side plates adjacent the bottom rear of the frame, a chart take up roll rotatably mounted between the side plates adjacent the bottom front of the frame, a platen extending between the side plates adjacent the front of the frame, a chart extending from the chart supply roll over the chart feed roll and the platen to the chart take up roll, a first reversible electric motor carried by the frame, means connecting the first reversible electric motor to the chart feed roll, means for operating the first reversible electric motor in one direction for moving the chart in one direction toward the chart take up roll and in the opposite direction for moving the chart in the opposite direction toward the chart supply roll, means including a friction drive wheel movably supported by the frame between the chart take up roll and the chart supply roll and adapted selectively to engage one or the other of said rolls, a second reversible electric motor carried by the frame, means connecting the second reversible electric motor to the friction drive wheel, and means for operating the second reversible electric motor in one direction and engaging the friction drive wheel with the chart take up roll when the first electric motor is operated in said one direction also to move the chart in said one direction, and for operating the second reversible electric motor in the opposite direction and engaging the friction drive wheel with the chart supply roll when the first electric motor is operated in said opposite direction also to move the chart in said opposite direction, said second reversible electric motor tending, through the friction drive wheel, to move the chart in said one or opposite directions at a greater speed than the chart is moved in said one or opposite direction by the chart feed roll and the first reversible electric motor, slip friction means in the connecting means between the second reversible electric motor and the friction drive wheel to cause the chart to be moved at a lesser speed determined by the chart feed roll and the first reversible electric motor and to cause the chart to be tensioned by the friction drive wheel, a normally engaged clutch in the connecting means between the first reversible electric motor and the chart feed roll, and means for disengaging the clutch to cause the chart to be moved in said one or opposite directions at said greater speed determined by the friction drive wheel and the second reversible electrical motor.

4. In a measuring and recording instrument having recording means adjacent a chart feed roll and movable across a chart for making a record on the chart, the improvement comprising, a chart feed roll, a chart supply roll, a chart take up roll, a chart extending from the chart supply roll over the chart feed roll to the chart take up roll, a first reversible electric motor for rotating the chart feed roll in one direction to move the chart in one direction toward the chart take up roll and for rotating the chart feed roll in the opposite direction to move the chart in the opposite direction toward the chart supply roll, a second reversible electric motor for rotating the chart take up roll in one direction also to move the chart in said one direction toward the chart take up roll and for rotating the chart supply roll in the opposite direction also to move the chart in said opposite direction toward the chart supply roll, means for controlling said first and second reversible electric motors to move the chart in said one or opposite directions at a desired speed, said second reversible electric motor being operable to move the chart at a greater speed than said first reversible electric motor, and means for disconnecting the chart feed roll from the first reversible electric motor to allow independent movement of the chart at said greater speed by the second reversible electric motor.

5. In a measuring and recording instrument having recording means adjacent a chart feed roll and movable across a chart for making a record on the chart, the improvement comprising, a chart feed roll, a chart supply roll, a chart take up roll, a chart extending from the chart supply roll over the chart feed roll to the chart take up roll, a first reversible electric motor for rotating the chart feed roll in one direction to move the chart in one direction toward the chart take up roll and for rotating the chart feed roll in the opposite direction to move the chart in the opposite direction toward the chart supply roll, a second reversible electric motor for rotating the chart take up roll in one direction also to move the chart in said one direction toward the chart take up roll and for rotating the chart supply roll in the opposite direction also to move the chart in said opposite direction toward the chart supply roll, means for controlling said first and second reversible electric motors to move the chart in said one or opposite directions, said second reversible electric motor tending to move the chart in said one or opposite directions at a greater speed than the chart is moved in said one or opposite directions by the first reversible electric motor means, said second motor having slip friction means to cause the chart to be moved at a lesser speed determined by the first reversible electric motor and to cause the chart to be tensioned by the second reversible electric motor and means for disconnecting the chart feed roll from the first reversible electric motor to allow independent movement of the chart at said greater speed by the second reversible electric motor.

6. In a measuring and recording instrument having recording means adjacent a chart feed roll and movable across a chart for making a record on the chart, the improvement comprising, a chart feed roll, a chart supply roll, a chart take up roll, a chart extending from the chart supply roll over the chart feed roll to the chart take up roll, first motor means for rotating the chart feed roll in one direction to move the chart in one direction toward the chart take up roll and for rotating the chart feed roll in the opposite direction to move the chart in the opposite direction toward the chart supply roll, second motor means for rotating the chart take up roll in one direction also to move the chart in said one direction toward the chart take up roll and for rotating the chart supply roll in the opposite direction also to move the chart in said opposite direction toward the chart supply roll, and means for controlling said first and second motor means to move the chart in said one or opposite directions, said second motor means tending to move the chart in said one or opposite directions at a greater speed than the chart is moved in said one or opposite directions by the first motor means, said second motor means having slip friction means to cause the chart to be moved at a lesser speed determined by the first motor means and to cause the chart to be tensioned by the second motor means, said first motor means having a normally engaged clutch, and means for disengaging the clutch to cause the chart to be moved in said one or opposite directions at said greater speed determined by the second motor means.

7. In a measuring and recording instrument having recording means adjacent a chart feed roll and movable across a chart for making a record on the chart, the improvement comprising, a chart feed roll, a chart supply roll, a chart take up roll adjacent the chart supply roll, a chart extending from the chart supply roll over the chart feed roll to the chart take up roll, first motor means for rotating the chart feed roll in one direction or the opposite direction to move the chart in one direction or the opposite direction, a shaft rotatably mounted between the chart take up roll and the chart supply roll, second motor means for rotating the shaft in one direction or the opposite direction, a carrier rotatably mounted on the shaft, a friction drive wheel rotatably mounted on the carrier, gear means connecting the shaft to the friction drive wheel for rotating the latter in one direction and for rotating the carrier to a position where the friction drive wheel engages the chart on the chart take up roll to move the chart toward the chart take up roll when the shaft is rotated in one direction, and for rotating the friction drive wheel in the opposite direction and for rotating the carrier to another position where the friction drive wheel engages the chart on the chart supply roll to move the chart toward the chart supply roll when the shaft is rotated in the opposite direction, said second motor means being operable to move the chart at a greater speed than said first motor means, and means for disconnecting the chart feed roll from the first motor means to allow independent movement of the chart at said greater speed by the second motor means.

8. In a measuring and recording instrument having recording means adjacent a chart feed roll and movable across a chart for making a record on the chart, the improvement comprising, a chart feed roll, a chart supply roll, a chart take up roll adjacent the chart supply roll, a chart extending from the chart supply roll over the chart feed roll to the chart take up roll, first motor means for rotating the chart feed roll in one direction or the opposite direction to move the chart in one direction or the opposite direction, a shaft rotatably mounted between the chart take up roll and the chart supply roll, second motor means for rotating the shaft in one direction or the opposite direction, a carrier rotatably mounted on the shaft, a friction drive wheel rotatably mounted on the carrier, gear means connecting the shaft to the friction drive wheel for rotating the latter in one direction and for rotating the carrier to a position where the friction drive wheel engages the chart on the chart take up roll to move the chart toward the chart take up roll when the shaft is rotated in one direction, and for rotating the friction drive wheel in the opposite direction and for rotating the carrier to another position where the friction drive wheel engages the chart on the chart supply roll to move the chart toward the chart supply roll when the shaft is rotated in the opposite direction, and spring biased slip friction means interposed between the friction drive wheel and the gear means to allow the friction drive wheel to slip with respect to the gear means when the load on the friction drive wheel exceeds a predetermined value, said second motor means being operable to move the chart at a greater speed than said first motor means, and means for disconnecting the chart feed roll from the first motor means to allow independent movement of the chart by the second motor means.

9. In a measuring and recording instrument having recording means adjacent a chart feed roll and movable across a chart for making a record on the chart, the improvement comprising, a chart feed roll, a chart supply roll, a chart take up roll, a chart extending from the chart supply roll over the chart feed roll to the chart take up roll, a first reversible electric motor connected to the chart feed roll for rotating the chart feed roll in a forward direction to move the chart forwardly at a desired speed toward the chart take up roll and for rotating the chart feed roll in a rearward direction to move the chart rearwardly at a desired speed toward the chart supply roll, an electromagnetic clutch in the connection between first electric motor and the chart feed roll, a second reversible electric motor and a friction drive wheel driven thereby for engaging and rotating the chart take up roll in a direction to tend to move the chart forwardly at an increased speed and for engaging and rotating the chart supply roll in a direction to tend to move the chart rearwardly at an increased speed, first switching mechanism electrically connected to said first and second reversible electric motors and to said electromagnetic clutch and movable to a forward position to engage the clutch and operate the first and second electric motors in a direction to move the chart forwardly at the desired speed, movable to a rearward position to engage the clutch and operate the first and second electric motors in a direction to move the chart rearwardly at the desired speed, and movable to a neutral position to disengage the clutch and de-energize the first electric motor to allow the chart to be moved forwardly or rearwardly at the increased speed by the second electric motor and the friction drive wheel; and a second switch mechanism electrically connected to the second electric motor when the first switch mechanism is in neutral position to operate the second electric motor in one direction or the other to move the chart forwardly or rearwardly at the increased speed.

10. In a measuring and recording instrument having recording means adjacent a chart feed roll and movable across a chart for making a record on the chart, the improvement comprising, a chart feed roll, a chart supply roll, a chart take up roll, a chart extending from the chart supply roll over the chart feed roll to the chart take up roll, a first reversible electric motor connected to the chart feed roll for rotating the chart feed roll in a forward direction to move the chart forwardly at a desired speed toward the chart take up roll and for rotating the chart feed roll in a rearward direction to move the chart rearwardly at a desired speed toward the chart supply roll, an electromagnetic clutch in the connection between first electric motor and the chart feed roll, a rectifier, a second reversible electric motor and a friction drive wheel driven thereby for engaging and rotating the chart take up roll in a direction to tend to move the chart forwardly at an increased speed and for engaging and rotating the chart supply roll in a direction to tend to move the chart rearwardly at an increased speed, a first switching mechanism electrically connected to said first and second reversible electric motors, said electromagnetic clutch and said rectifier and movable to brake position to engage the clutch, to energize said first electric motor through the rectifier to brake the first electric motor and to de-energize the second electric motor, movable to a forward position to engage the clutch and operate the first and second electric motors in a direction to move the chart forwardly at the desired speed, movable to a rearward position to engage the clutch and operate the first and second electric motors in a direction to move the chart rearwardly at the desired speed, and movable to a neutral position to disengage the clutch and de-energize the first electric motor to allow the chart to be moved forwardly or rearwardly at the increased speed by the second electric motor and the friction drive wheel, and a second switch mechanism electrically connected to the second electric motor when the first switch mechanism is in neutral position to operated the second electric motor in one direction or the other to move the chart forwardly or rearwardly at the increased speed.

11. In a measuring and recording instrument having recording means adjacent a chart feed roll and movable across a chart for making a record on the chart, the improvement comprising, a frame including a pair of side plates, a chart feed roll rotatably mounted between the side plates adjacent the top of the frame, a chart supply roll rotatably mounted between the side plates adjacent the bottom rear of the frame, a chart take up roll rotatably mounted between the side plates adjacent the bottom front of the frame, a platen extending between the side plates adjacent the front of the frame, a chart extending from the chart supply roll over the chart feed roll and the platen to the chart take up roll, a reversible electric motor carried by the frame, means connecting the reversible electric motor to the chart feed roll, means for operating the reversible electric motor in one direction or the opposite direction for moving the chart in one direction or the opposite direction, said platen being pivotally mounted at its top to the side plates of the frame, and means for swinging the bottom of the platen outwardly and latching the platen in tilted position to provide a tilted table surface for the chart to facilitate placing of notations thereon.

References Cited in the file of this patent

UNITED STATES PATENTS

| | | |
|---|---|---|
| 704,854 | Brook | July 15, 1902 |
| 900,059 | Doremus | Sept. 29, 1908 |
| 1,050,872 | Torney | Jan. 21, 1913 |
| 1,638,657 | Cox | Aug. 9, 1927 |
| 1,927,899 | Mylius et al. | Sept. 26, 1933 |
| 2,059,879 | La Pierre | Nov. 3, 1936 |
| 2,153,317 | Sigo | Apr. 4, 1939 |
| 2,253,309 | Smellie | Aug. 19, 1941 |
| 2,414,976 | Redhed | Jan. 28, 1947 |
| 2,423,480 | Caldwell | July 8, 1947 |
| 2,524,564 | Gorham | Oct. 3, 1950 |
| 2,555,643 | Harrison | June 5, 1951 |
| 2,690,951 | Moore | Oct. 5, 1954 |
| 2,920,148 | Munroe | Jan. 5, 1960 |
| 2,953,312 | Munroe | Sept. 20, 1960 |